United States Patent [19]

Saunders

[11] Patent Number: 5,005,356
[45] Date of Patent: Apr. 9, 1991

[54] TORQUE CONVERTER UTILIZING STREAMWISE VORTICITY

[76] Inventor: Walter S. Saunders, 307 Thornhill Rd., Baltimore, Md. 21212

[21] Appl. No.: 54,582

[22] Filed: May 27, 1987

[51] Int. Cl.$^5$ .............................................. F16D 33/00
[52] U.S. Cl. ..................................... 60/330; 416/180
[58] Field of Search .................. 60/330, 338, 341, 345, 60/361, 363, 366, 367; 415/55.1, 55.2, 52.1, 54.1; 416/180

[56] References Cited

U.S. PATENT DOCUMENTS 3,824,038  7/1974  Tokunaga ......................... 416/180
3,940,929  3/1976  Bezimensky ........................ 60/330

Primary Examiner—Edward K. Look
Attorney, Agent, or Firm—F. Eugene Davis, IV

[57] ABSTRACT

A novel torque converter is disclosed which utilizes streamwise vorticity as well as a mean flow within the passageways of the machine to transfer energy efficiency over an extended utility ratio. This is accomplished with novel blade structures utilizing salient edges disposed in part along the mean flow path. Pairs of counter rotating vortices are produced by the impeller blades. The direction of rotation of these vortices is reversed by the turbine blades, efficiently transferring torque from the impeller to the turbine. At speed ratio zero the directions of rotation of the vortices leaving the turbine are again reversed by the stator to impart torque to the stator. This continues until the design speed ratio is achieved. Thereafter, the vortices are guided by the stator passages to the impeller. Below the design speed ratio, the impeller guides the vortices through it to the turbine where their flow is reversed. Above the design speed, the vortices from the stator are reversed by the impeller. At all speed ratios, the vortices of the invention flow with the mean flow through the hydraulic circuit. Their flow is not reversed.

34 Claims, 30 Drawing Sheets

FIG. 1

FIG. 1
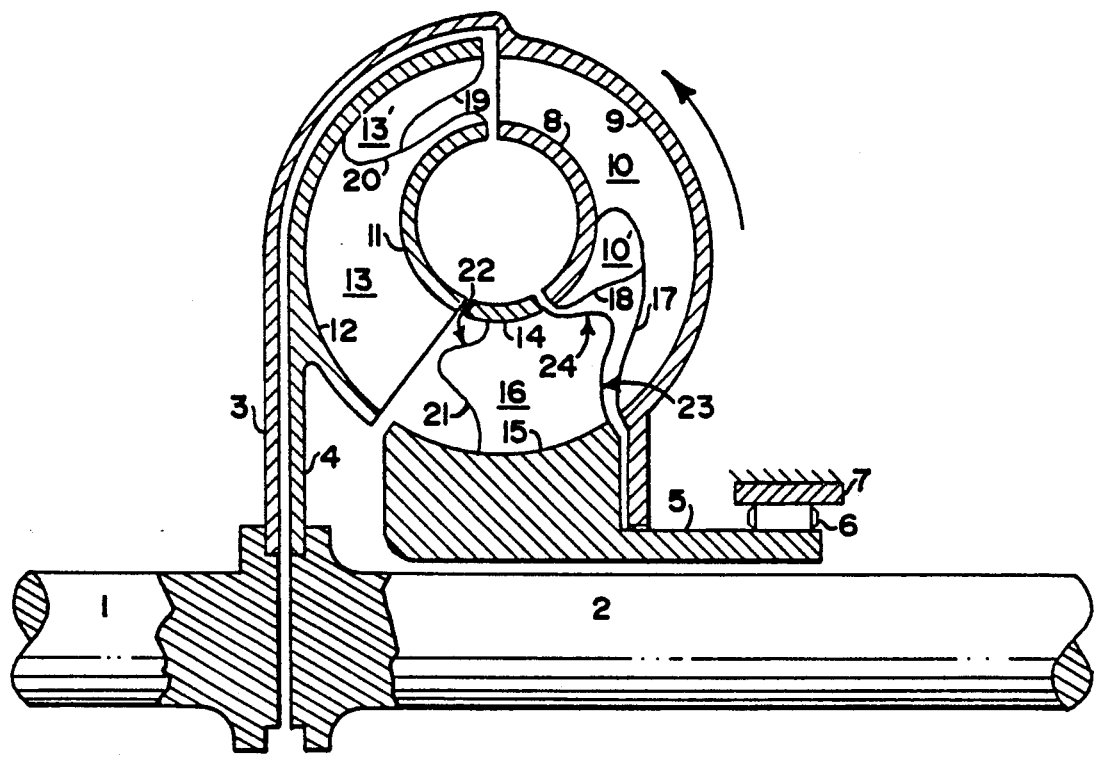
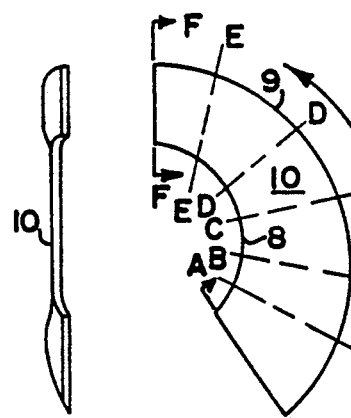
PRIOR ART
FIG. 2
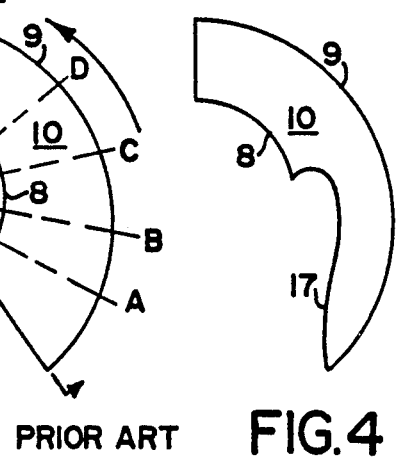
PRIOR ART
FIG. 3
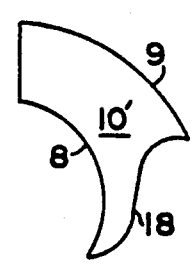
FIG. 4
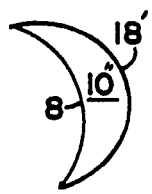
FIG. 5
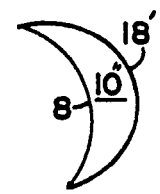
FIG. 6

FIG. 2.1.1
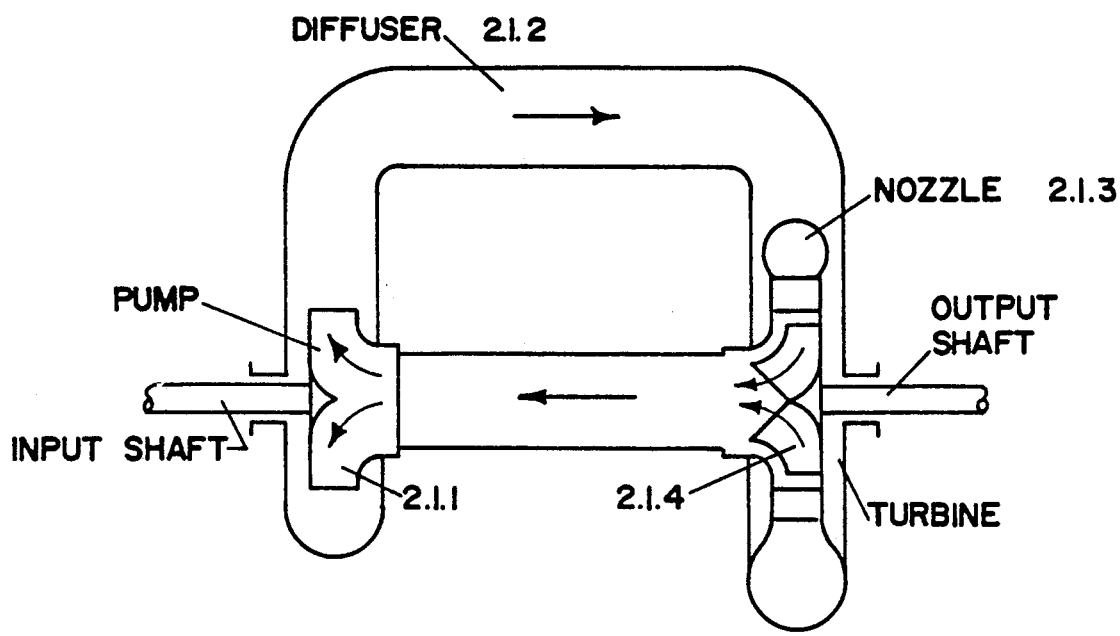
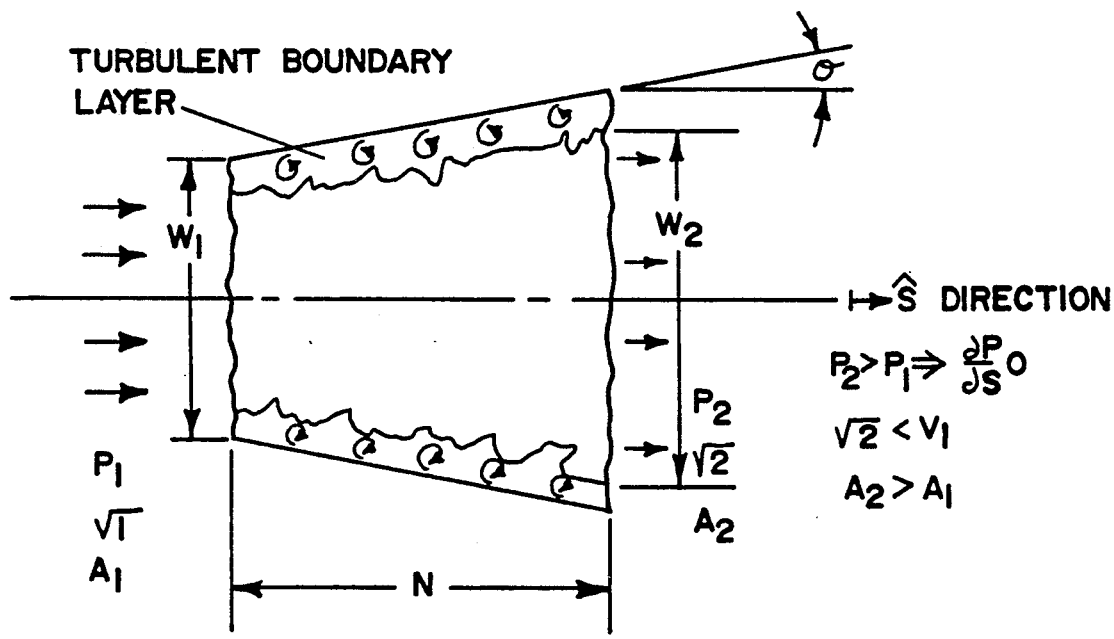
FIG. 2.1.2-a

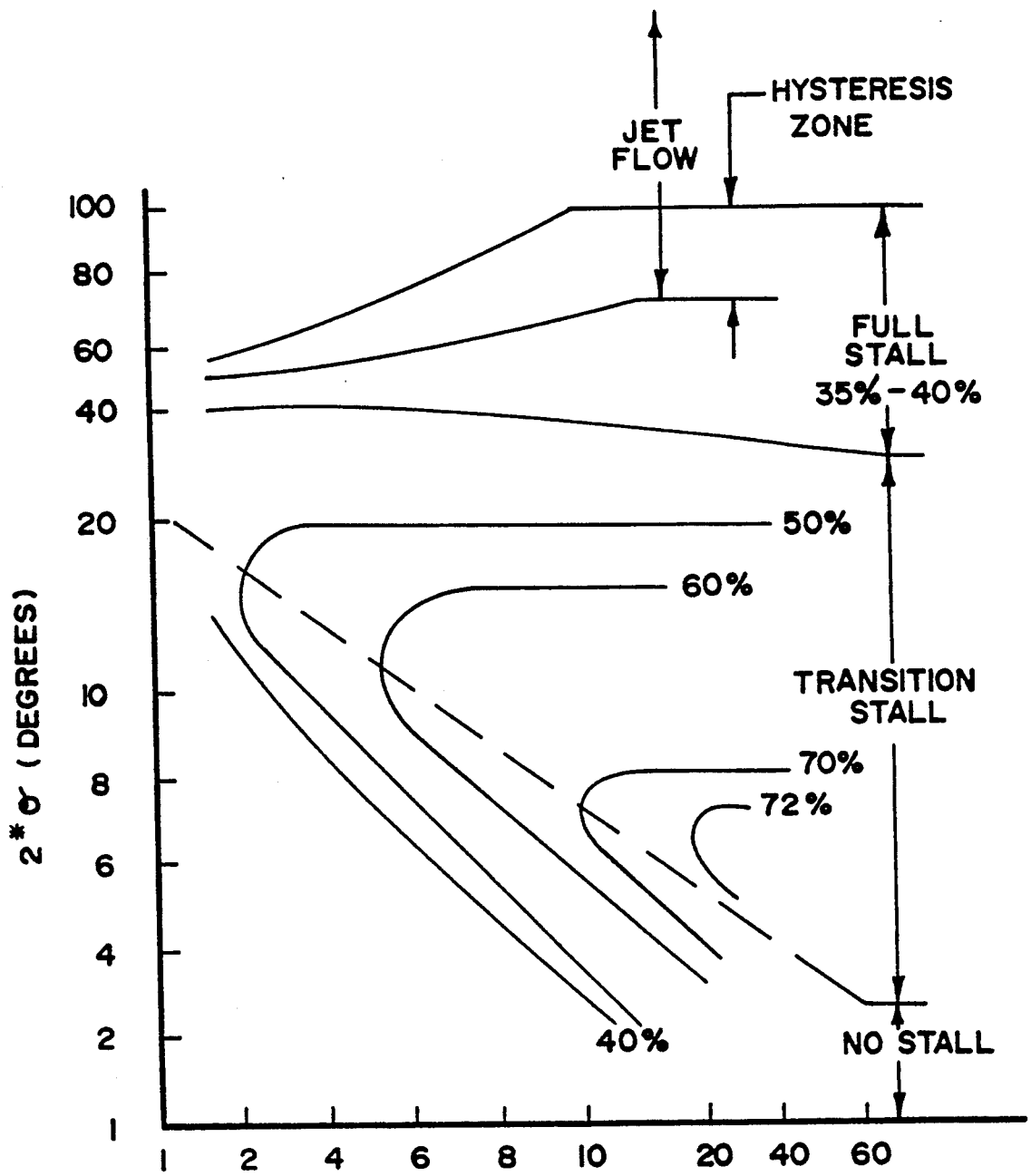
FIG. 2.1.2-b

FIG. 2.1.3
FIG. 2.1.4
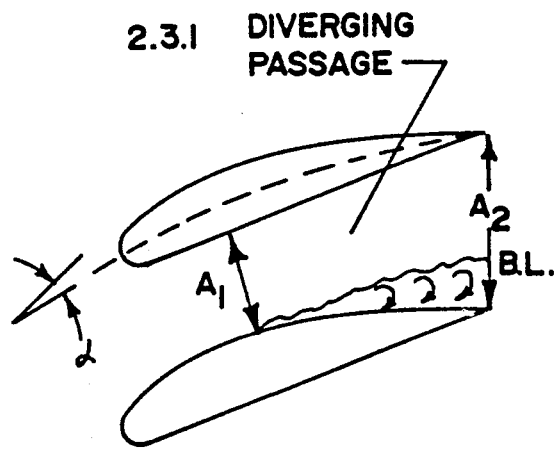
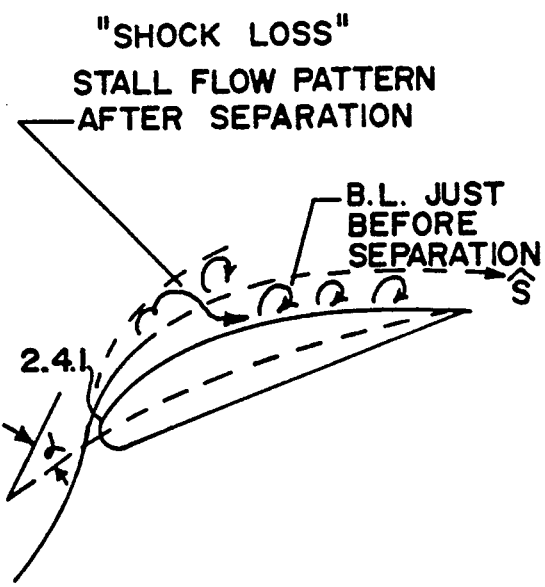
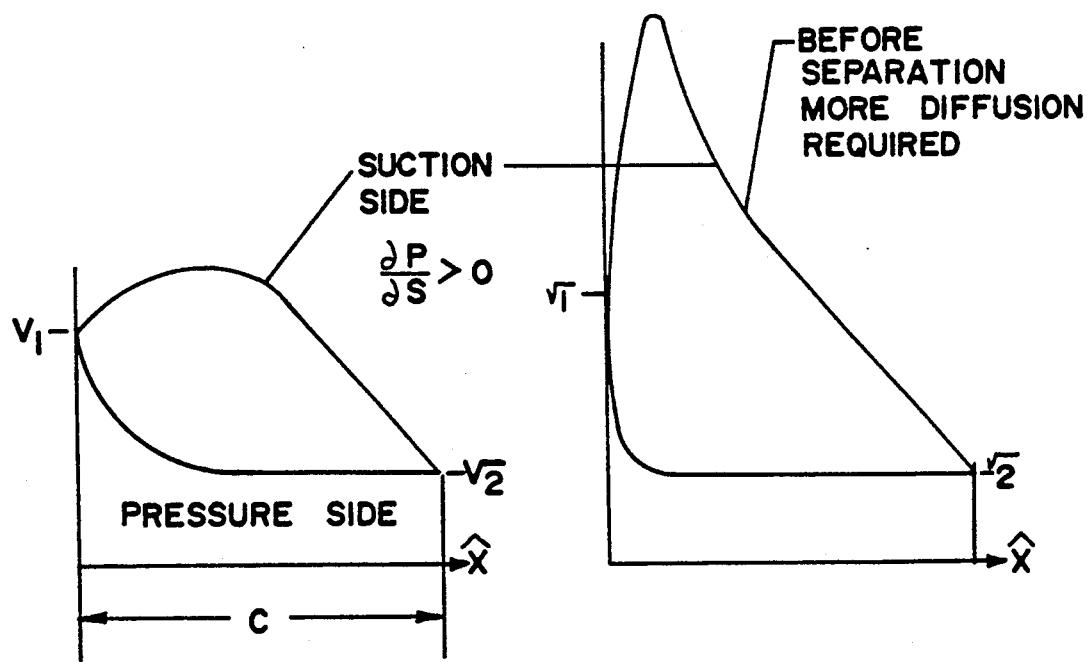
FIG. 2.1.3-a
FIG. 2.1.4-a

FIG. 2.1.5-a

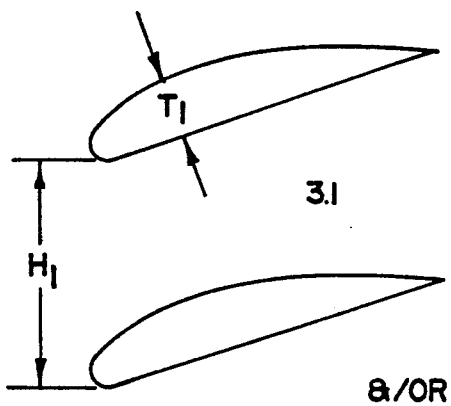

GOOD ON-DESIGN EFFICIENCY
NOSE STALL OCCURS EARLY
GIVING LARGE "SHOCK" LOSS
AND LIMITING OFF-DESIGN
PERFORMANCE

FIG. 2.1.5-b

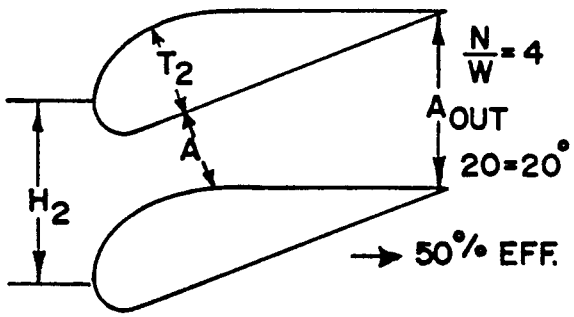

GOOD OFF-DESIGN
EFFICIENCY NOSE STALL
AVOIDED BUT DIVERGING
PASSAGE LIMITS ON-DESIGN
EFFICIENCY COMPARE
WITH FIG. 2.1.2

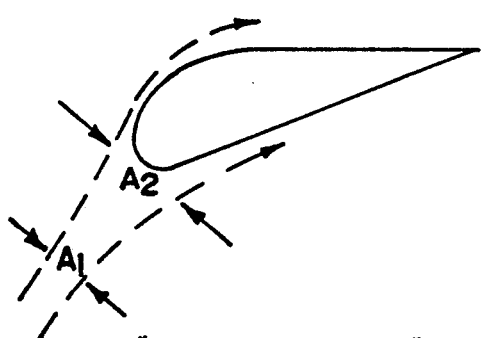

"FREE DIFFUSION"
OCCURS WITHOUT
LOSS FROM $A_1$ TO $A_2$

FIG. 2.2.1

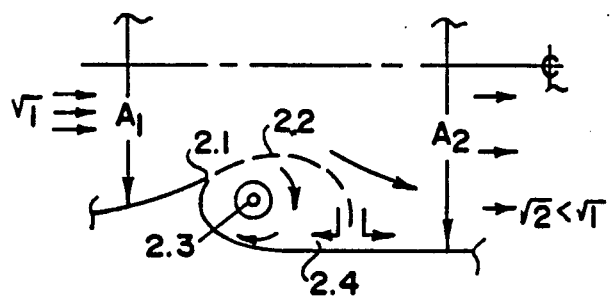

2-D CUSP DIFFUSSER WITH
FREE DIFFUSION
(INOPERATIVE) DUE TO
RINGLEB

FIG. 2.2.2

FIG. 2.3.1
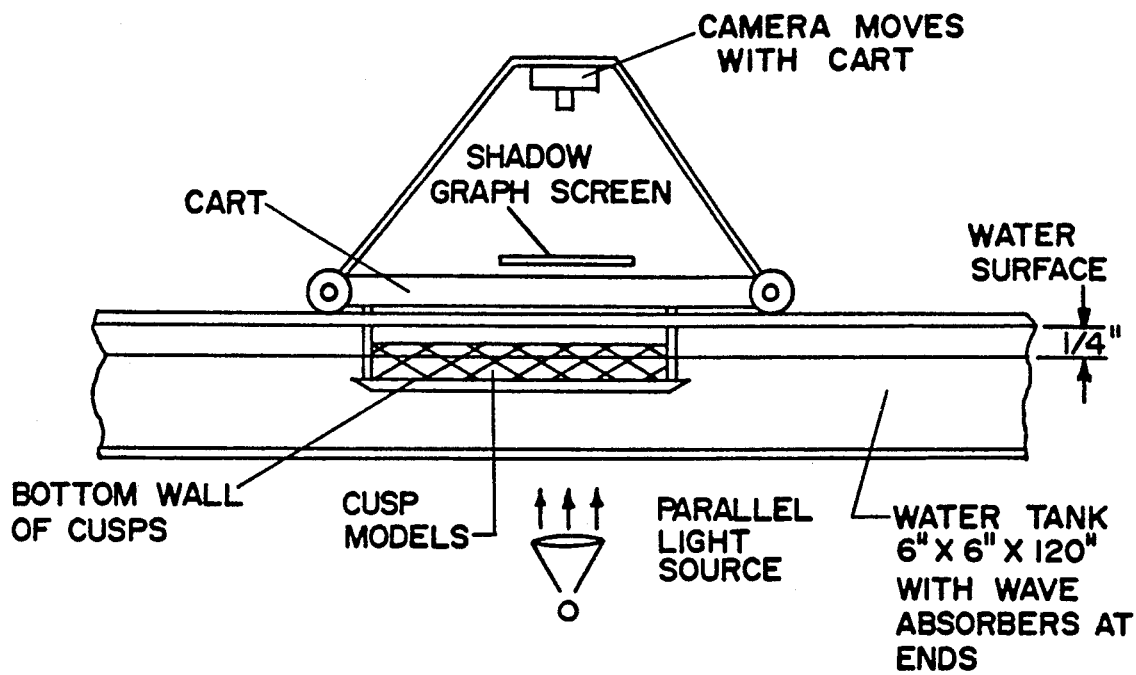
FIG. 2.3.2
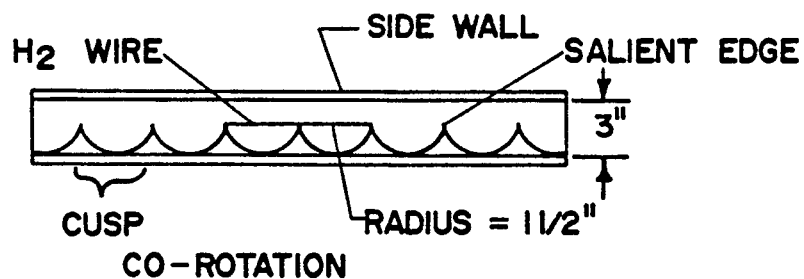
CUSP
CO-ROTATION
FIG. 2.3.3
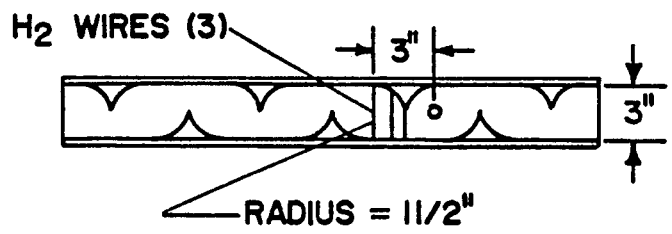
CONTRA-ROTATION

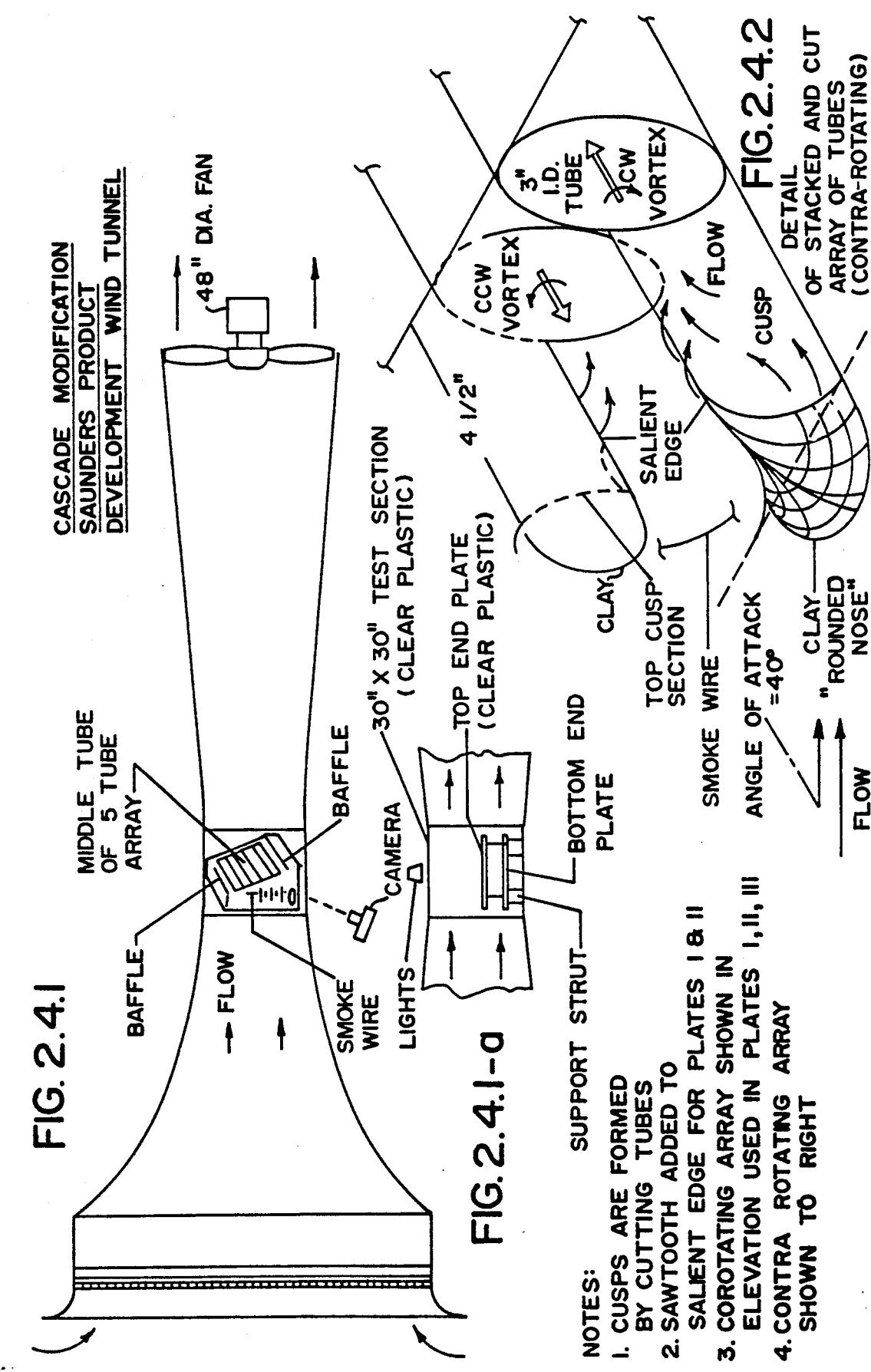

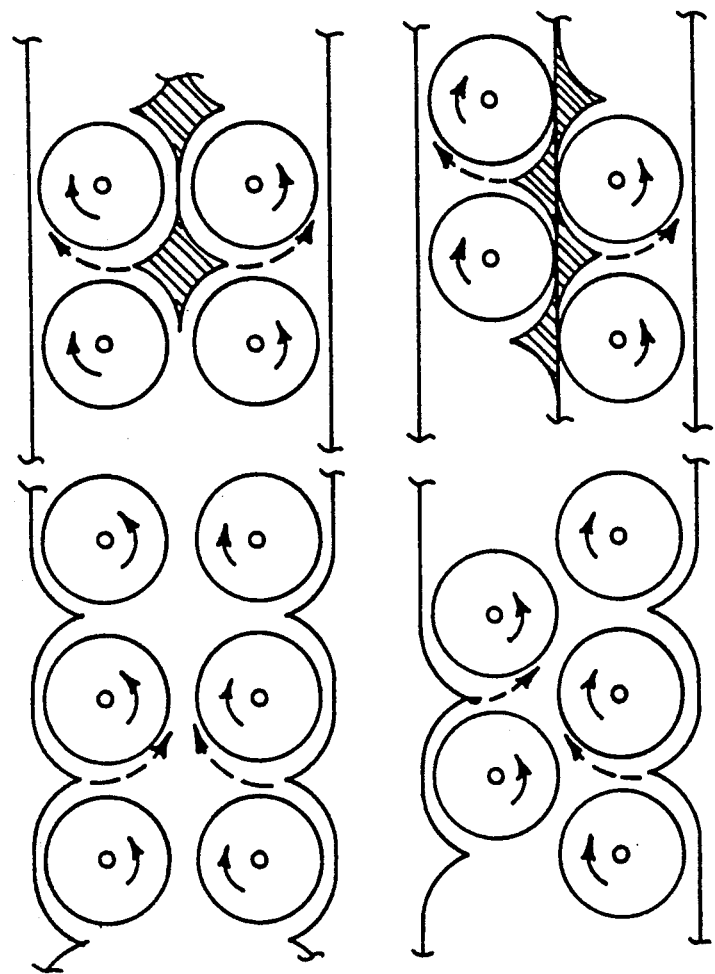
FIG. 2.4.5
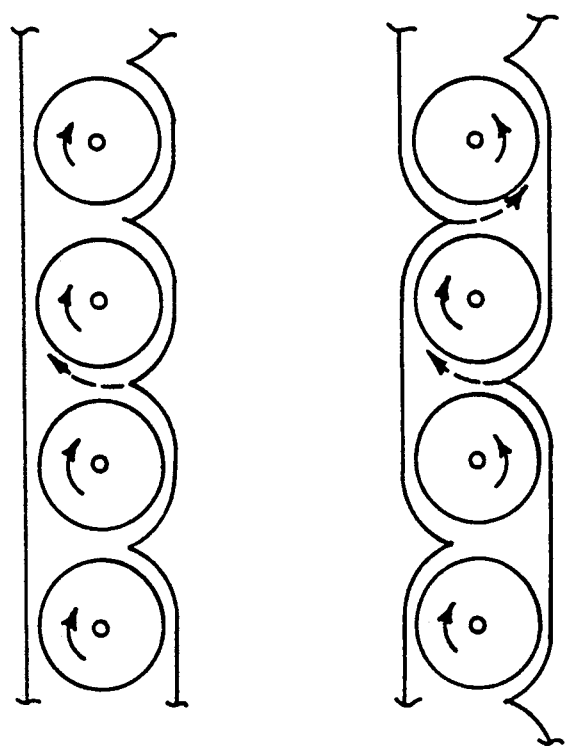
FIG. 2.4.4

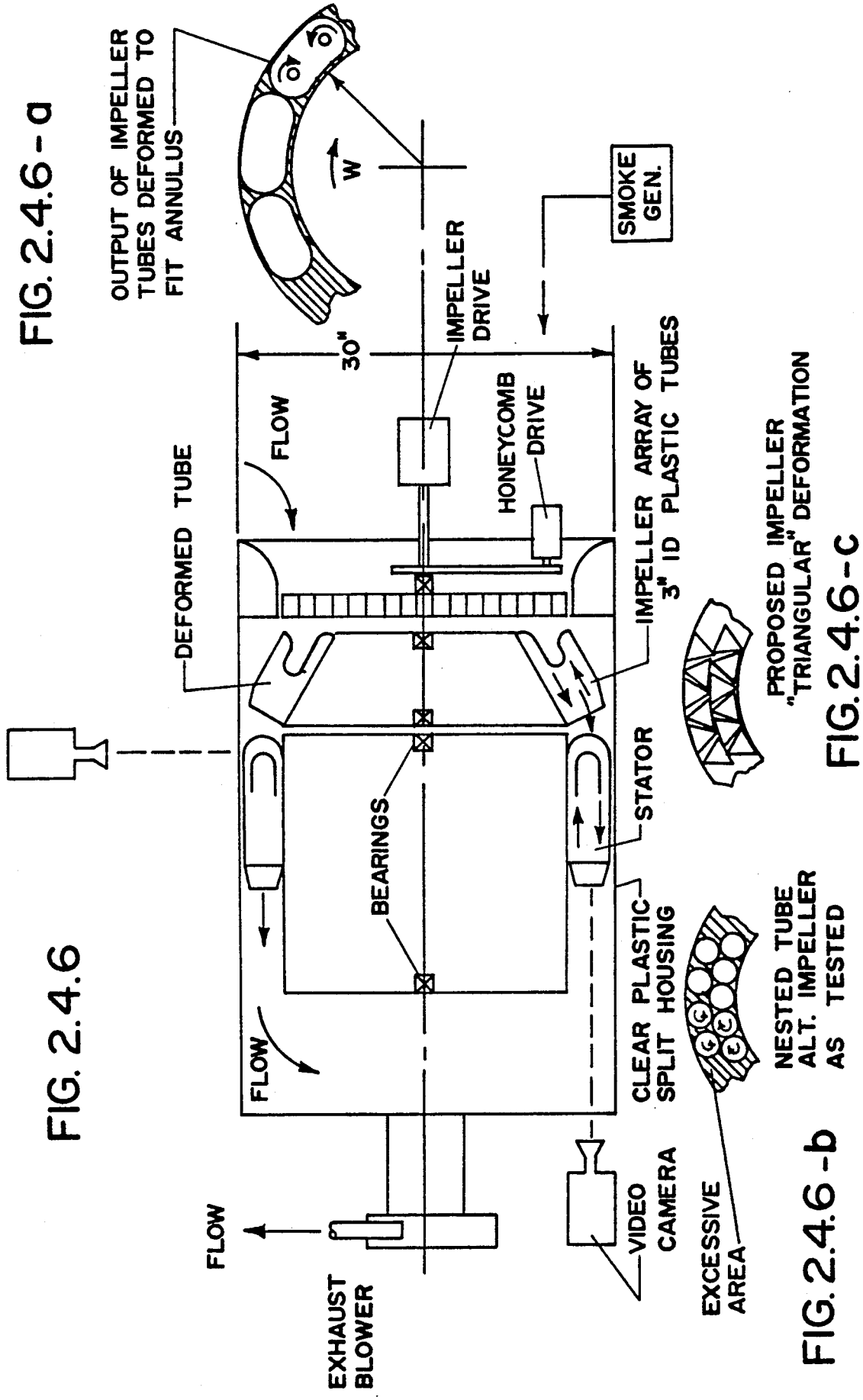

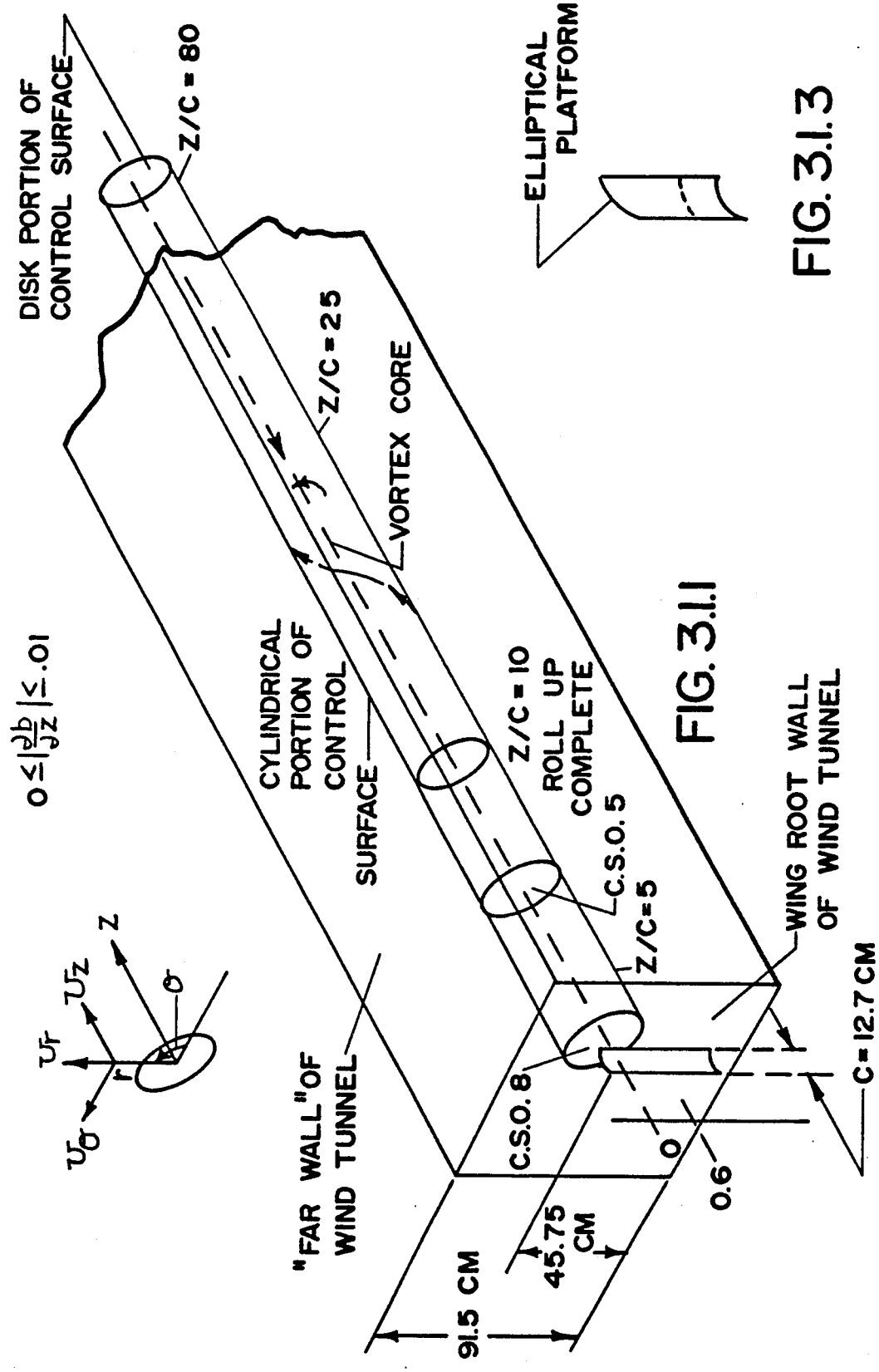

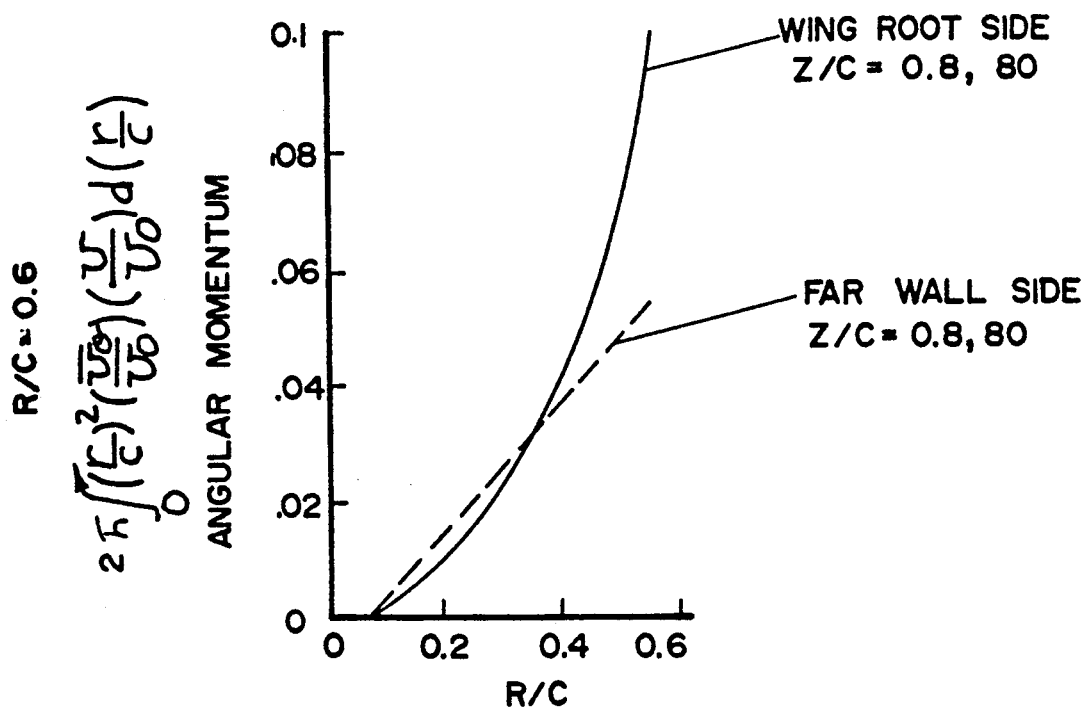
FIG. 3.1.4
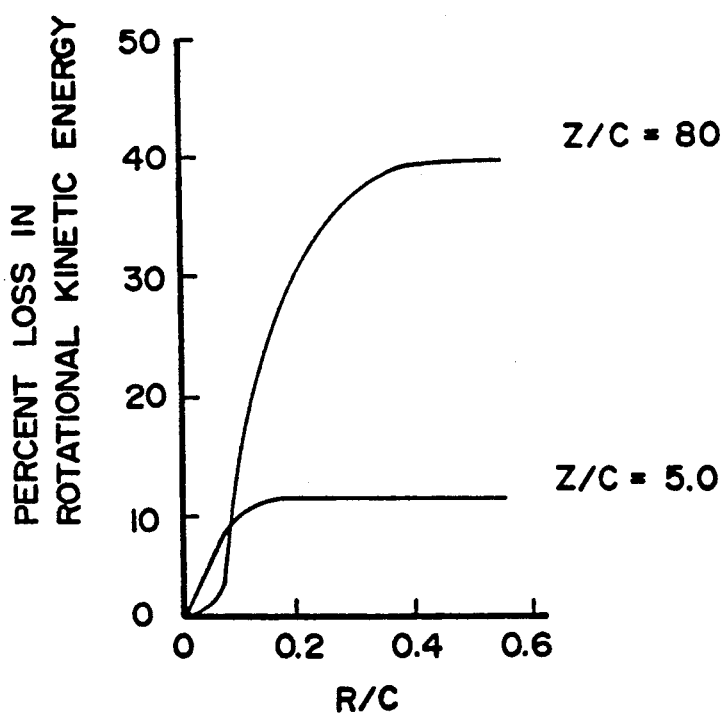
FIG. 3.1.5

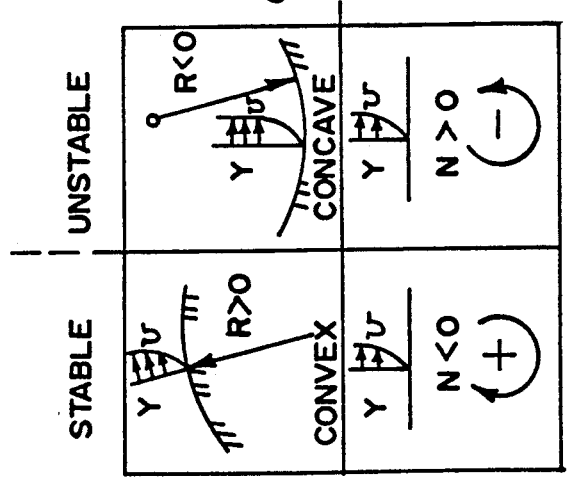
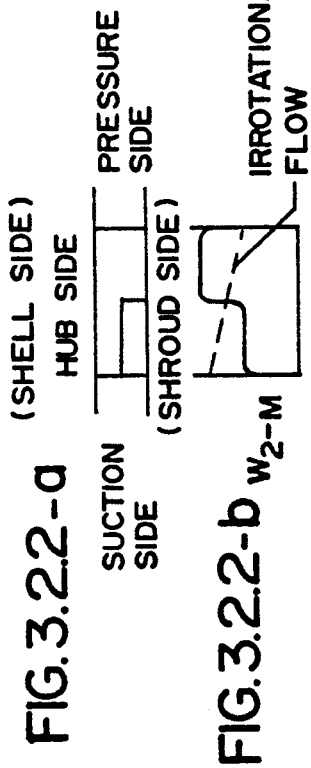
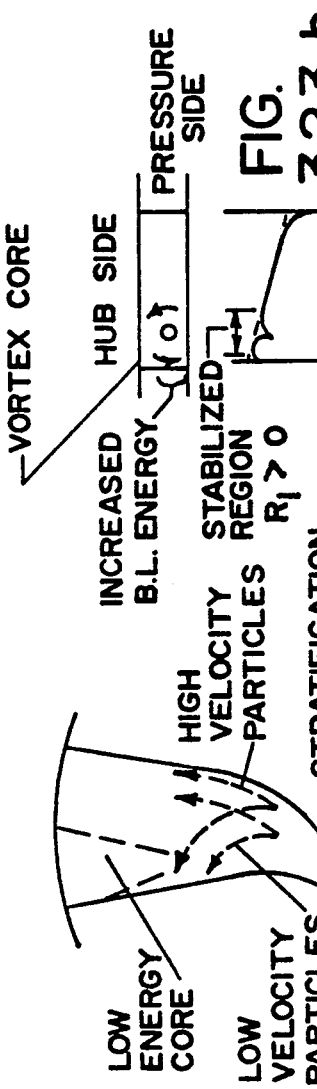
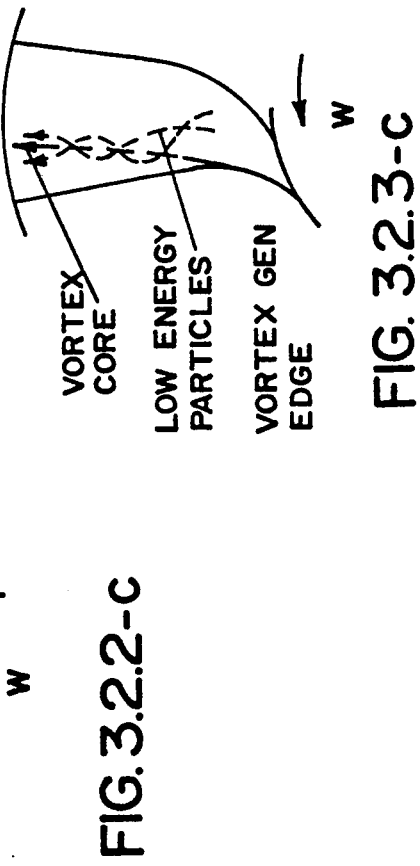

FIG. 3.3.1
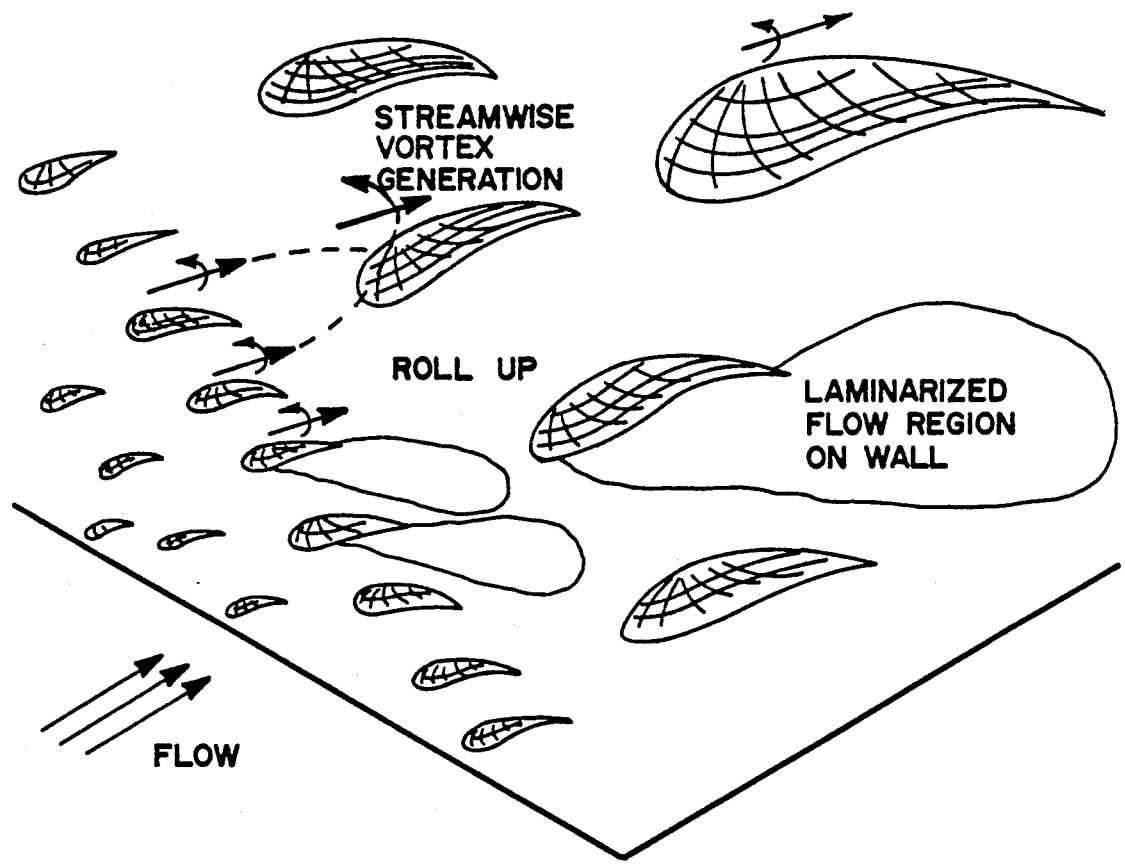
FIG. 3.2.4
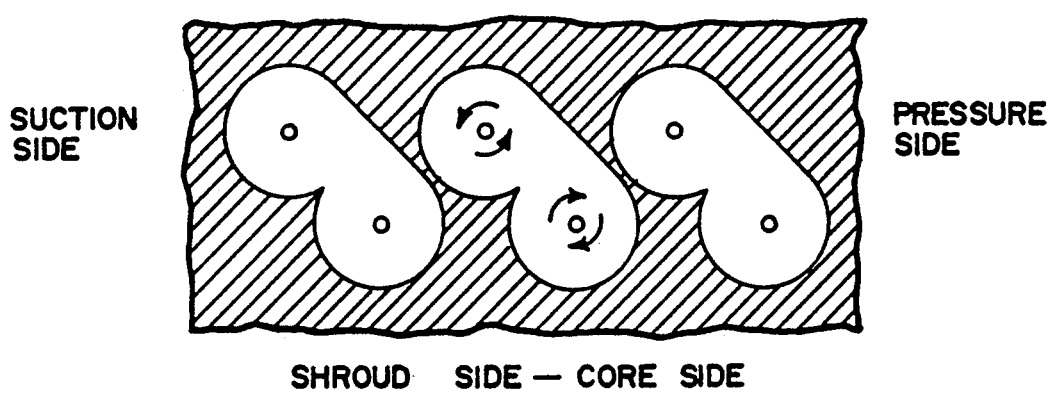

FIG. 3.4.1
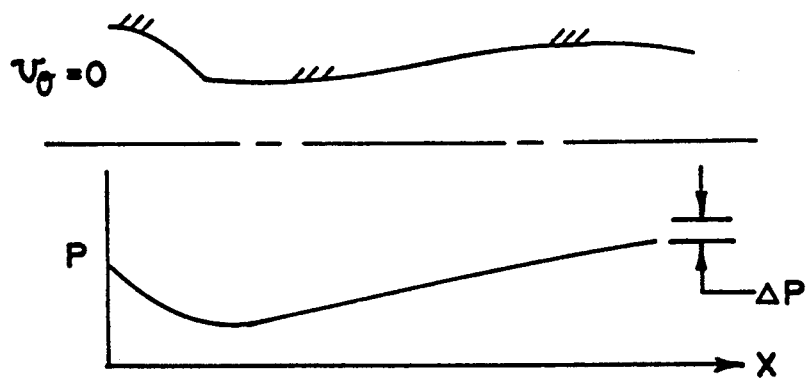
FIG. 3.4.2
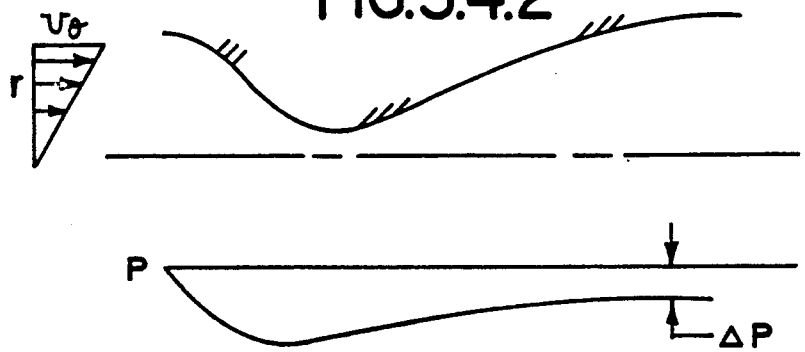
FIG. 3.4.3
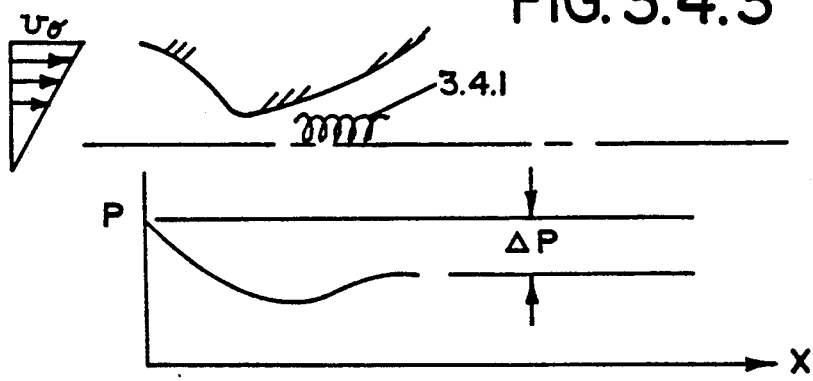
FIG. 3.4.4
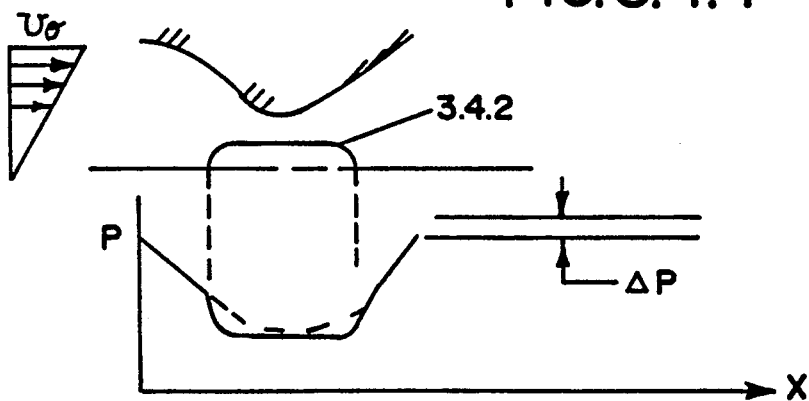

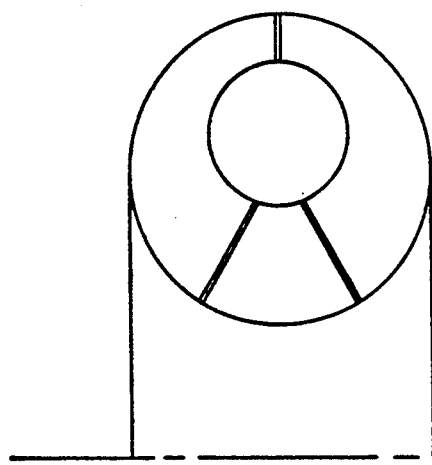
FIG. 4.1.1
FIG. 4.1.2
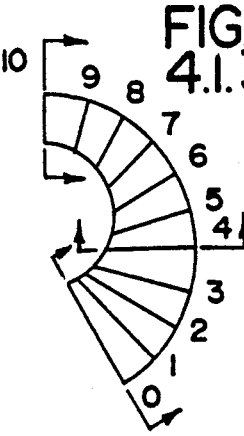
FIG. 4.1.3-a
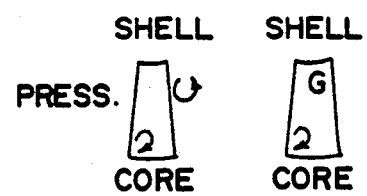
FIGS. 4.1.3-0
4.1.3-2
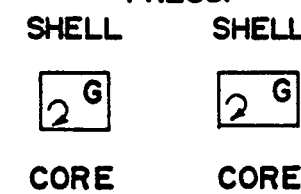
4.1.3-4
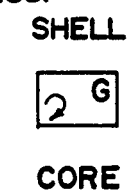
4.1.3-6
4.1.3-8
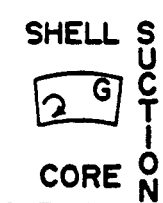
4.1.3-10
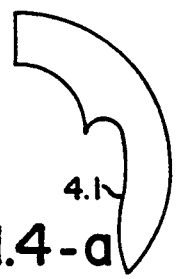
FIG. 4.1.4-a
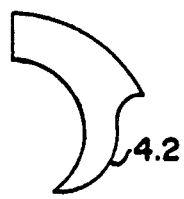
FIG. 4.1.4-b
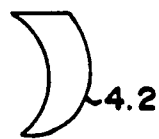
FIG. 4.1.5
FIG. 4.1.6-0
FIG. 4.1.6-2
FIG. 4.1.6-4
FIG. 4.1.6-6
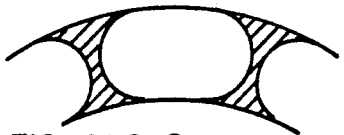
FIG. 4.1.6-8
FIG. 4.1.6-10

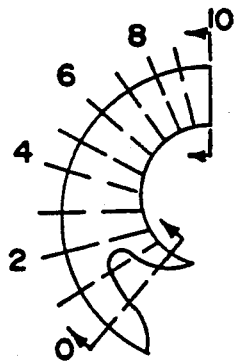
FIG. 4.2.1-a  FIG. 4.2.1-b
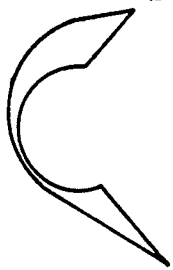
FIG. 4.2.2-a
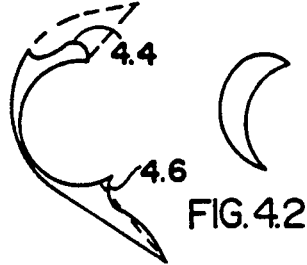
FIG. 4.2.2-b  FIG. 4.2.3
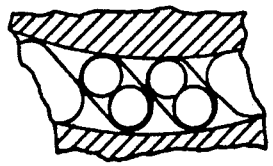
FIG. 4.2.4-0
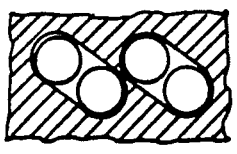
FIG. 4.2.4-2
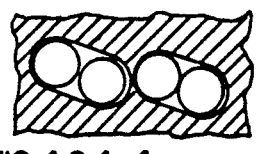
FIG. 4.2.4-4
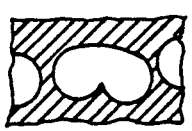
FIG. 4.2.4-6
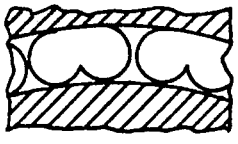
FIG. 4.2.4-8
FIG. 4.2.4-10
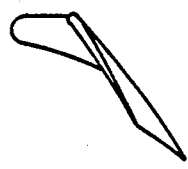
FIG. 4.3.1-a
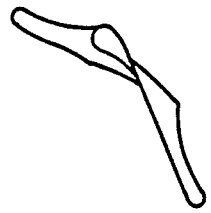
FIG. 4.3.2-a
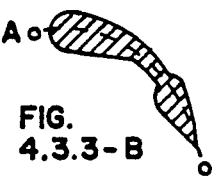
FIG. 4.3.3-A
FIG. 4.3.4-D
FIG. 4.3.4-C  FIG. 4.3.4-A
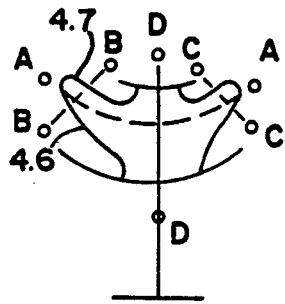
FIG. 4.3.1-b  FIG. 4.3.2-b
FIG. 4.3.3-B
FIG. 4.3.3-C
B-B 4.6  C-C 4*  C-C 4*

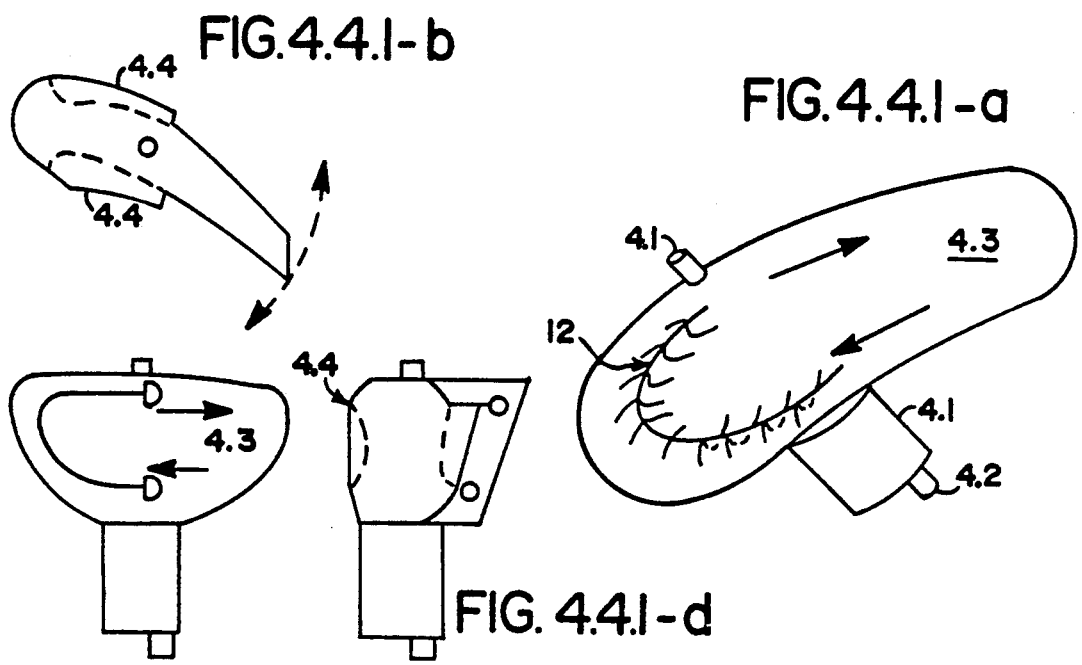
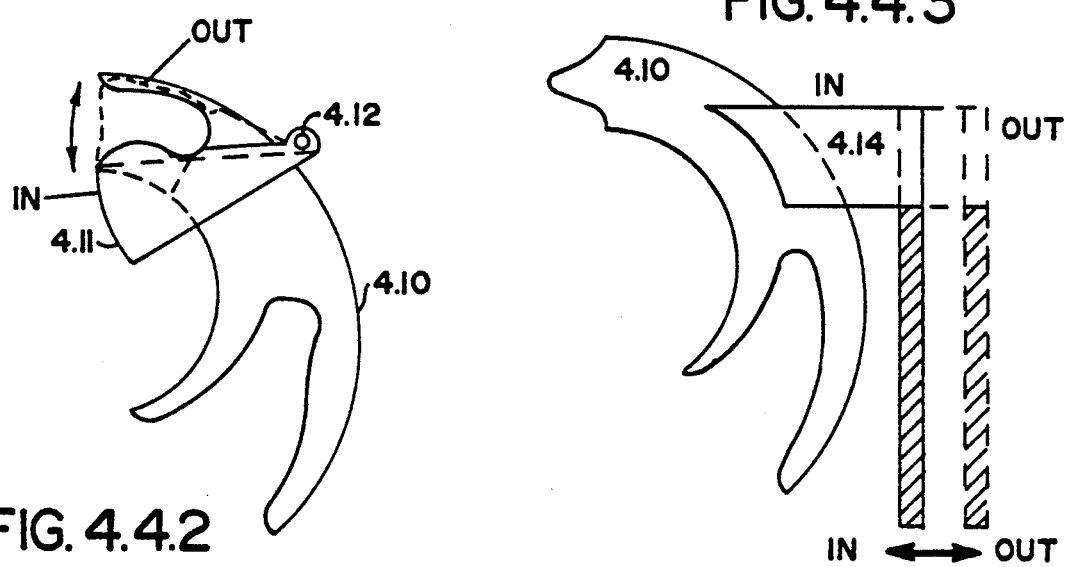
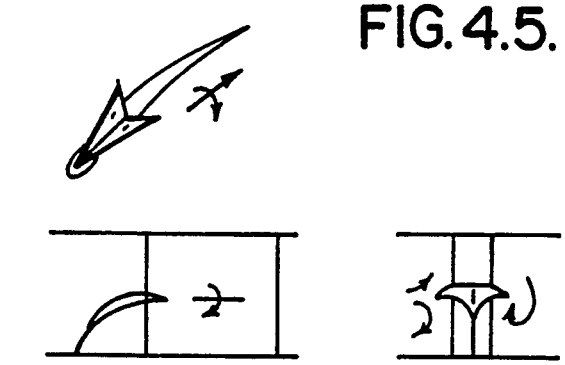

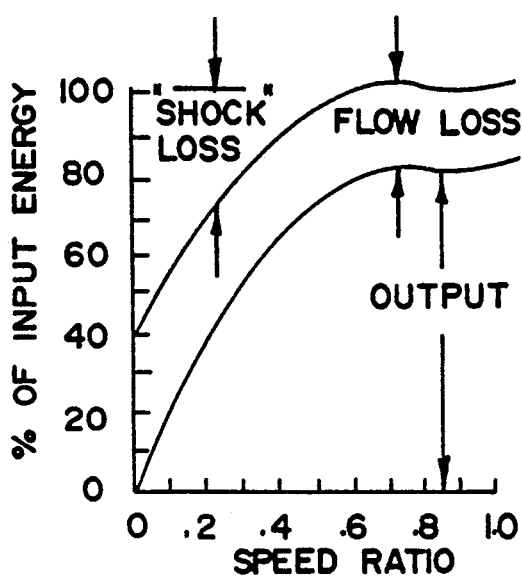
FIG. 5.1.1
DATA FROM FIG. 19 OF WALKER (REF. 5)
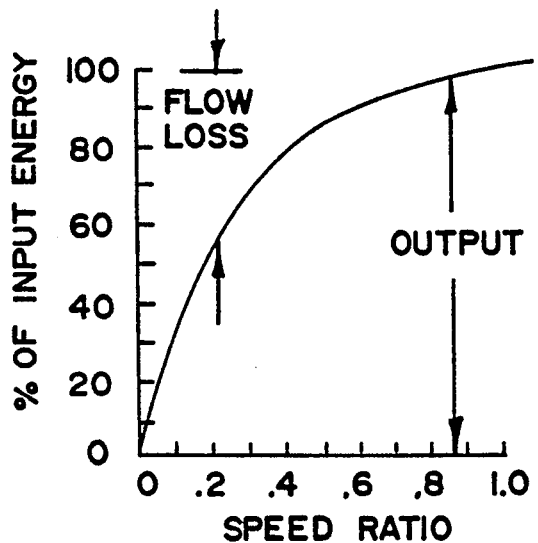
FIG. 5.1.2
DATA OF FIG. 1 WITH $C_S = 0$
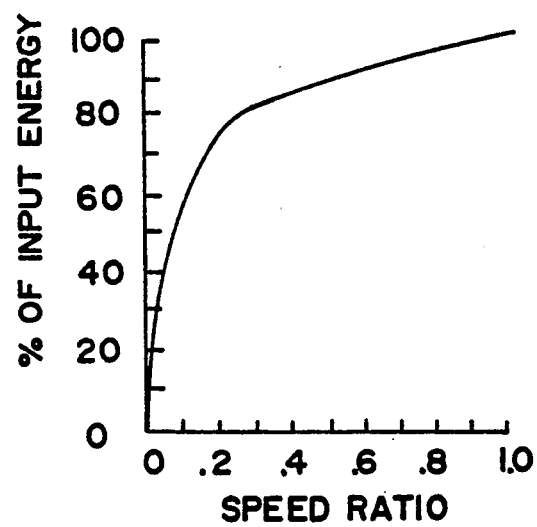
FIG. 5.2.1
$c_s = 0$
$c'_f = 1/2 \, c_f$

A-A

B-B

C-C

D-D

E-E

F-F

L-L

K-K

J-J

I-I

H-H

G-G

O-O

N-N

P-P

P'-P'

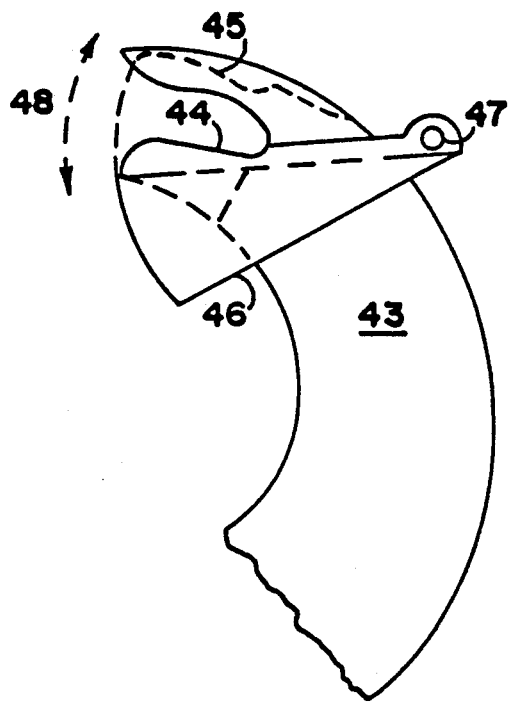
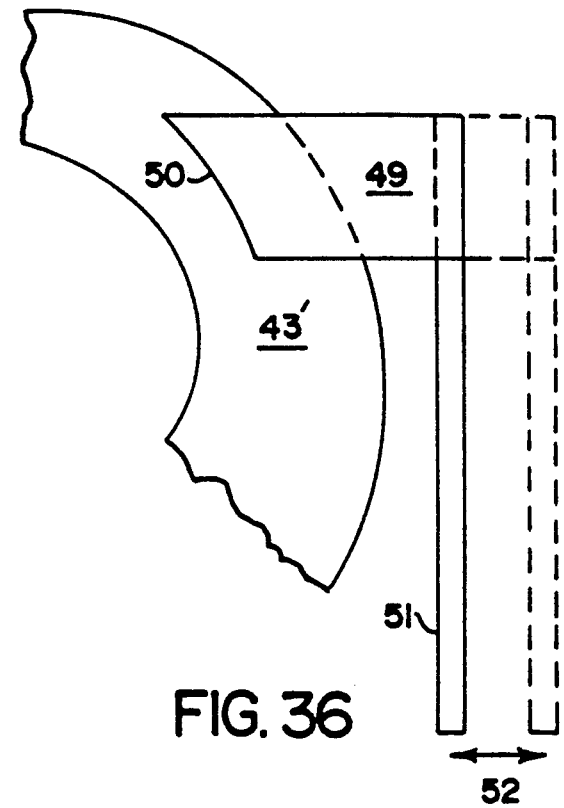
FIG. 35    FIG. 36
FIG. 37
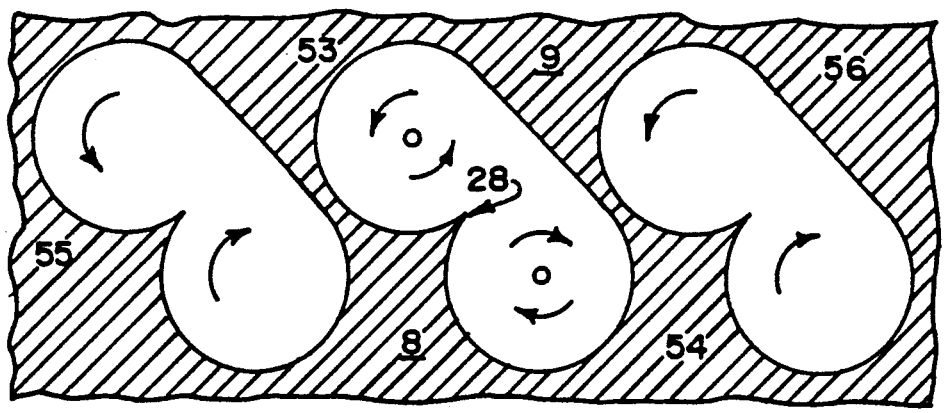

TORQUE CONVERTER UTILIZING STREAMWISE VORTICITY

TECHNICAL FIELD

A torque converter is typically used to connect a constant rotative speed power source to a load requiring variable speed drive. The operating characteristic most desired is a large utility ratio. This is defined as the ratio of the upper and lower output speeds at which the efficiency of energy transmission falls off to a predetermined value, usually 80% of maximum.

A conventional machine has a fundamental limit to its utility ratio imposed by the so called "hydraulic shock" loss. The machine of the invention utilizes a structure which eliminates this source of loss and thereby allows for an advance in the magnitude of the attainable utility ratio.

OBJECTS OF THE INVENTION

The principal object of the invention is to provide a torque converter of extended utility ratio.

Another object of the invention is to provide novel means of control of the improved machine.

Yet another object of the invention is to provide an improve torque converter which is effective when only partially filled with hydraulic fluid.

BRIEF DESCRIPTION OF THE DRAWINGS

FIG. 1 is a partial side cross sectional view of a torque converter according to my invention.

FIGS. 2 and 8 are front views of impeller blades which would be used if the machine were a conventional one.

FIGS. 3 and 7 are side views of turbine blades which would be used if the machine were a conventional one.

FIGS. 4, 5 and 6 are side views of impeller blades according to the invention.

FIGS. 35 and 36 are side views of movable elements to be used with certain passageways in a machine according to the invention.

FIG. 37 shows yet another modification to the section of FIG. 14.

The same reference characters refer to the same elements throughout FIGS. 1 through 47 of the drawings.

FIGS. 2.1.1 through FIG. 5.2.1 are illustrations forming part of a technical description of the invention.

The same reference characters refer to the same elements throughout the several views of FIGS. 2.1.1 through FIG. 5.2.1.

Figure 7:
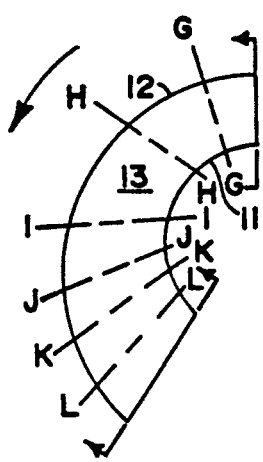
Figure 8:
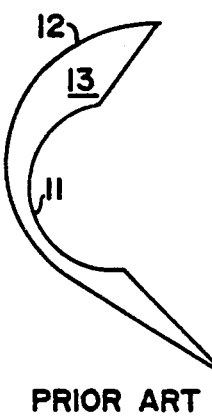

All of the views herein, and the use of front and side to describe certain views, conform to the usage of SAE publication number AE-5, Chapter 21, Design of Single Stage Three-element Torque Converter by V. J. Jandasek.

FIGS. 48 through 57 are photographs of flow visualization studies illustrating the principles of the invention.

BEST MODE FOR CARRYING OUT THE INVENTION

A torque converter according to the invention is shown in FIG. 1. The input shaft is denoted by 1 and the output shaft by 2. The input shaft drives a centrifugal pump or impeller consisting of a housing 3, a shell member 9, and an inner core member 8. The hydrodynamic blading array is mounted between member 8 and 9, forming the passageway of the impeller. The blades 10 and 10' are shown in FIG. 1 and various forms of blades are shown in FIGS. 2 through 6. The output runner or turbine consists of a hub 4 supporting a shell 12 and an inner core 11. Turbine blades 13 and 13' are shown in FIG. 1 and various forms for them are shown in FIGS. 7 through 11. The stator is supported by its hub 5 and consists of a core 14 and shell 15 with blades 16 mounted therebetween. Forms of blades are shown in FIGS. 24 through 30 and FIGS. 31 through 34. The stator is connected to a fixed frame 7 through a one-way clutch shown schematically at 6.

The operation of a conventional torque converter can be understood by referring to FIG. 1. The flow of the hydraulic fluid contained within the machine is directed outwardly away from the shaft and energized by the blading 10 within the rotating impeller. The fluid then enters the radial turbine runner where the energy of the fluid is extracted by the blades 13. Next the fluid enters the stator stage of the turbine where the torque reaction takes place. The general direction of flow is shown by the curved arrow.

This flow is controlled by the conventional blades 10 and 13 shown in FIGS. 2, 3, 7 and 8. These blades are designed to minimize the effects of the so-called secondary flows. These flows are ones which contain a component of vorticity in the mean stream direction within the passages formed by the core, shell and blades. In a conventional machine the energy of the secondary flows or streamwise vortices is lost and serves only to heat the working fluid so that the efficiency of the machine is reduced.

In a torque converter there is only one speed ratio at which the flow enters the blades at their design point. At all other speed ratios there is a non-optimum relative angle of attack between the flow direction and the direction of the blade camber line at its nose. This results in flow losses that are known in the literature as "hydraulic shock" losses or as "nose stall" losses. The approaching flow does not stay attached to the suction side of the blade. Rather, it forms a separation bubble with part of the flow recirculating in a direction which is reversed with respect to the mean flow. Under most conditions, the separation region or bubble is unstable and the energy of the flow is dissipated by the resulting turbulence. Since the energy associated with the turbulence resulting from this stalled condition is lost to the machine, its efficiency as an energy transmission device is reduced. In most practical calculations involving torque converters, the energy in the flow normal to the thin blade nose camber line is assumed to be entirely lost.

In a conventional prior art machine the thin blades shown in FIGS. 2, 3, 7 and 8 can be replaced with airfoil shaped blades with well-rounded noses. This reduces the nose stall loss. However, to reduce the nose stall completely requires the use of such thick blades that the flow passages become restrictively small and friction between the flowing fluid and these walls becomes excessively high. Thus, the design of the conventional machine is forced to compromise the peak efficiency obtained at the design point in order to obtain efficient operation over a wide range of speed ratios; i.e. the utility ratio is severely limited.

The present invention greatly reduces the severity of this compromise so that a more useful range of high efficiency can be achieved. This is accomplished by deliberately introducing secondary flows or streamwise vortices into the flow within the passageways of the machine. In a conventional machine the energy of these flows would be lost. However, in the present invention a novel structure is introduced in the following stages of the machine so that the energy of the vortices can be recovered. Furthermore, the structures which produce and recover the energy of these vortices are not subject to the compromises resulting from the nose stall phenomena of the conventional machine and an increased utility ratio is achieved.

A simple way to obtain the results of the invention is illustrated in FIGS. 1, 4, 5, 9 and 10. Every other impeller blade 10 and 10' is cut away alternating between the forms of FIGS. 4 and 5 to form the salient edges 17 and 18. These edges are disposed along the mean flow path. When fluid enters the impeller at a relative angle of attach to the blades, vortex sheets springing from these edges roll up into streamwise vortices which exist within the passageways of the impeller. Thus, nose separation stall and reversed flow is avoided. The energy in the component of the flow which would otherwise be lost is now largely contained within the secondary vortex flow. The blade 11" of FIG. 6 is an alternative embodiment of the blade 11' of FIG. 5.

Figure 9:
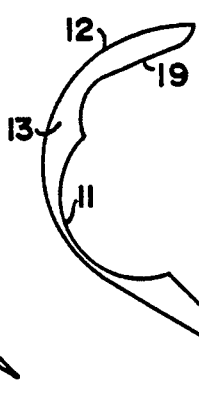
FIGS. 9, 10 and 11 are front views of turbine blades according to the invention.
Figures 10, 11:
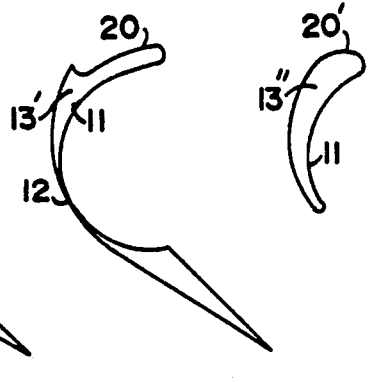

In a similar fashion, turbine blade 13, 13' is cut away alternating between the forms of FIGS. 9 and 10 to form salient edges 19 and 20 which are disposed along the mean streamwise direction. When the streamwise vortices impact this structure, the energy contained in them is transferred in part to the turbine. Nose stall at the turbine entrance is also avoided and the object of the invention is achieved. The blade 13" of FIG. 11 is an alternative embodiment of the blade 13' of FIG. 10.

The stator of the machine is modified as shown in FIGS. 24 through 30. Salient edges 21, 22, 23, and 24 of blade 16 is disposed along the mean streamline to control the streamwise vortices. Nose stall is avoided and the flow is fed back to the impeller in an efficient fashion.

Figure 12:
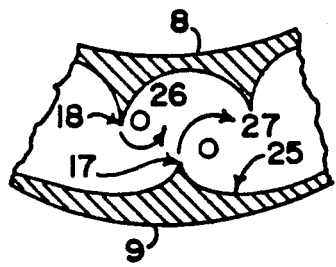
FIGS. 12 through 17 are sections through a passageway according to the invention taken along section lines indicated in FIG. 3.
Figure 13:
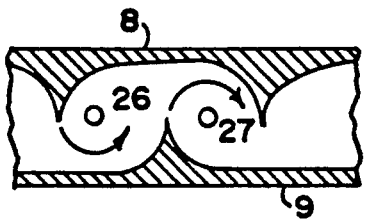

Further alternative embodiments are shown in FIGS. 12 through 30. FIG. 12 is a section normal to the mean flow taken along the line designated as A—A in FIG. 3. The alternate salient edges 17 and 18 are sharp edges located in the same place as described for the thin blades of FIGS. 4 and 5. However, the blades now have a fillet region 25 added on all sides to produce a cusp like shape. This avoids a square corner where the thin blade meets the shell or core walls and a more efficient flow is achieved.

In FIG. 12 the vortex sheets springing from the cusps are denoted by the arrows 26 and 27. These sheets are in the process of rolling up around the vortex cores denoted by the small circles in the figure. These vortices grow in strength and move into the region shown in FIG. 13 which is a section along B—B of FIG. 3. Thus the staggered row of vortices of FIG. 12 is being guided into a single row of FIGS. 13 through 17.

Figure 14:
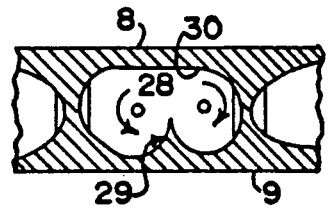
Figure 15:
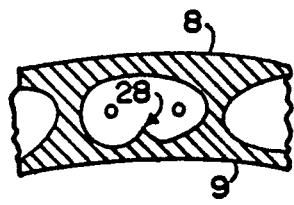
Figure 16:
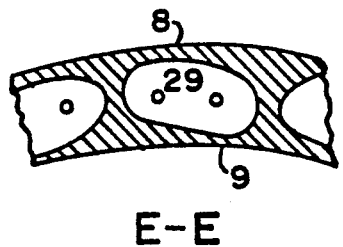
Figure 17:
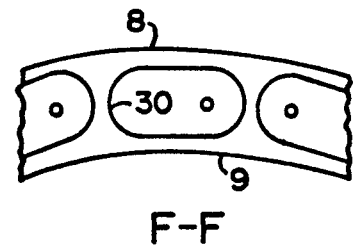
Figure 18:
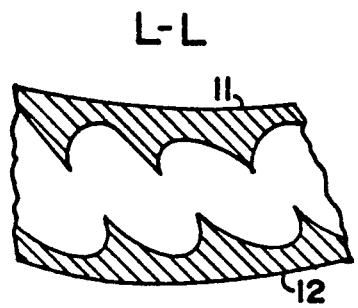
FIGS. 18 through 23 are sections according to the invention taken along the section lines shown in FIG. 7.

FIGS. 6, 14, and 15 show an additional modification. Since the vortices are stable structures, not as much transverse blade surface is required to guide the flow as in a conventional machine. Thus, the blade of FIG. 5 is further cut away as shown in FIG. 6. The salient edge 28 stabilizes and guides the flow. Fillets such as 29 form a cusp like structure for this edge. The walls of the passageway such as 30 where the blades are not cut away have been similarly rounded with fillets to avoid square corners. Indeed, the preferred shape of a passageway conducting a streamwise vortex approaches a circular section. The salient edge 28 is almost gone by the time the flow reaches section D—D shown in FIG. 15. It has vanished at station E—E shown in FIG. 16. Thus a contra-rotating pair of linear streamwise vortices are conducted by the oval channel 29 to the flatter channel 30 shown in FIG. 17. This Figure is a view of the exit of the impeller. The portion of the exit region 30 is rounded to allow the vortices to adjust to the entrance conditions of the turbine with salient edges 19 and 20.

Figure 19:
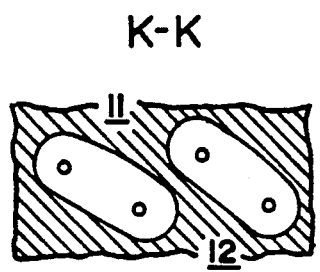
Figure 20:
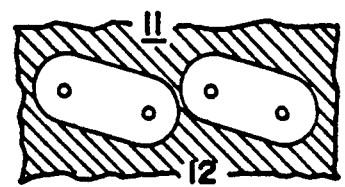
Figure 21:
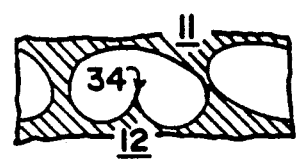
Figure 22:
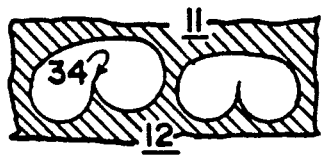
Figure 23:
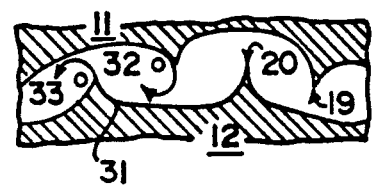

The same type of modifications to the turbine runner are shown in FIGS. 18 through 23. FIG. 23 shows the entrance region to the turbine taken at the location G—G shown in FIG. 7. Fillets such as 31 are added to make cusp like sections leading up to salient edges 19 and 20. The vortices are being generated as indicated by the arrows 32 and 33. The vortices are guided by the turbine passageways those sections are denoted H—H through L—L. Again some of the core blades are removed entirely as shown in FIG. 11 so that a salient edge 34 separates the vortex pair in FIGS. 21 and 22. By section J—J in FIG. 20, the edge has vanished. The passageway continuing each pair is now rotated as shown in FIGS. 19 and 20 so that the linear array of FIG. 23 becomes a double staggered row of streamwise vortices in section L—L of FIG. 18.

The vortices exiting the turbine runner impinge on the stator shown in FIGS. 24 through 30. A conventional stator would have a straight leading edge parallel to the exit edge of the conventional blade of FIG. 7 and a trailing edge parallel to the leading edge of the conventional impeller blade of FIG. 3. A section taken along M—M of FIG. 24 of a conventional blade would be airfoil shaped. In contrast to this the novel stator shown in FIG. 24 has leading edges 21 and 22 and trailing edges 23 and 24 disposed along the mean streamline direction. In addition to this the airfoil section has modifications shown in FIGS. 25 through 30. The purpose of these modifications is to control the streamwise vorticity in an efficient manner.

Figure 24:
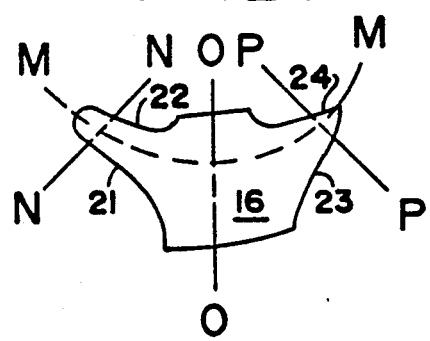
FIG. 24 is a side view of a stator blade according to the invention.
Figure 27:

The leading edge of the stator uses salient edges 21 and 22 shown in FIG. 24 that function in a manner similar to that described in connection with the impeller. This is shown in FIG. 27 which is a section N—N taken as indicated in FIG. 24. The arrows 35 and 36 indicate the generation of the streamwise vorticity. In this case a non-staggered double row of vortices is being generated. The pair of vortices is conducted into the section O—O of FIG. 26.

Figure 28:
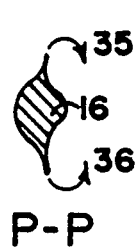
Figure 29:
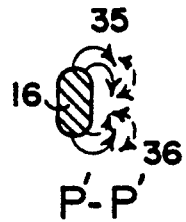

As this vortex pair enters the section P—P of FIG. 28 the transfer of energy into the vortices occurs along the trailing salient edges 23 and 24. These edges are disposed along the means streamwise direction and cut away as shown in FIG. 24. A sharp salient edge is not necessary to accomplish this energy transfer as is shown by the modified section P'—P' of FIG. 29.

Figure 25:
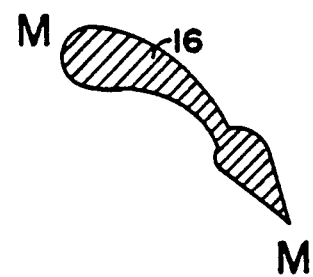
FIGS. 25 through 30 are sections taken along the section lines in FIG. 24.
Figure 26:
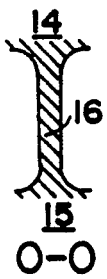
Figure 30:
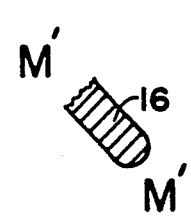
Figure 31:
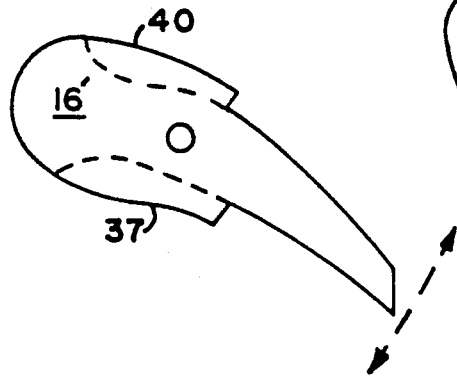
FIGS. 31, 32, 33 and 34 are the top, side, rear and perspective views of another embodiment of a stator blade according to the invention.
Figure 32:
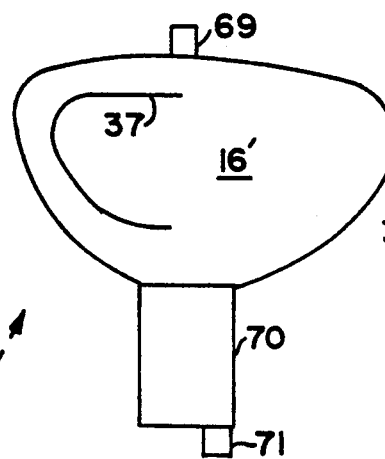
Figure 33:
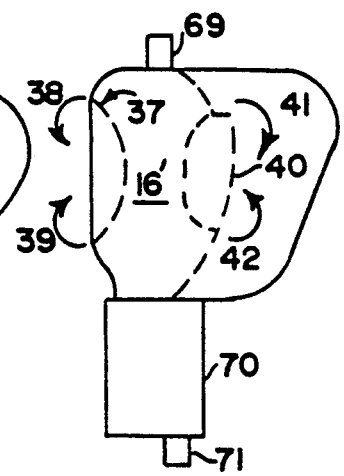
Figure 34:
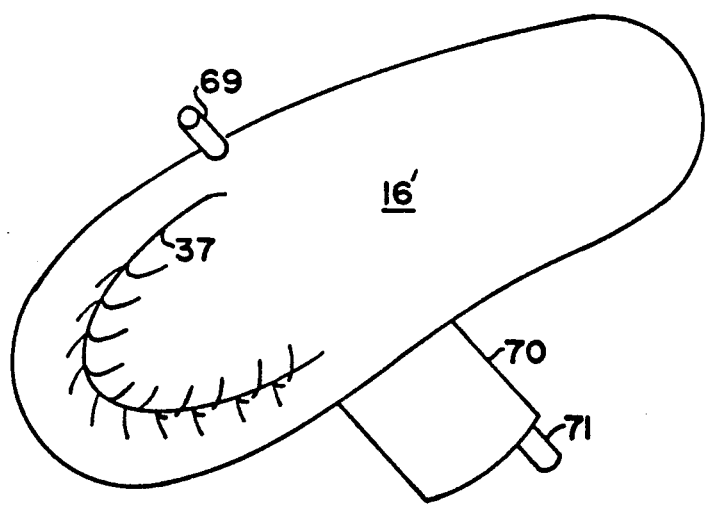

FIG. 25 shows the modification to the airfoil section M—M of FIG. 24. The modification allows the vortex pair to form in a stable oval shaped region while the cross sectional area of the passageway still flows the same pattern as would a passageway built of conventional airfoil members. An additional modification to this section is shown in FIG. 30 and is designated M—M. This modification rounds the trailing edge of the stator blade so that the entry flow conditions around the impeller salient edges 17 and 18 is accommodated. Notice that the exit portion 23 and 24 of the stator blades overlap the entrance region edges 17 and 18 of the impeller. Such an overlap is not possible in a conventional machine.

A modification to the stator blade is shown in FIGS. 31 through 34 which are the top, side, rear and perspective views of the novel blade. This blade is pivotally mounted on bearings 69 and 70 and a bell crank mechanism 71 is provided to adjust the pitch angle of the blade through eccentric 71.

This embodiment of the inventive concept yields a vorticity controlling salient edge without modifying the planform of the blade. The blade 16 is formed with a crescent shaped mound with salient edge 37. This mound resembles a crescent shaped sand dune as is sometimes found in nature. The edge 37 generates streamwise vorticity as indicated by the arrows 38 and 39. The other side of the blade 16 has a similar edge 40 which generates streamwise vorticity denoted by arrows 41 and 42. The vorticity is generated predominately on the suction side of the blade so that different vortex patterns form depending on the speed ratio of the machine and the pitch angle of the blade.

The exploitation of streamwise vorticity allows for novel variable geometry control elements. Two examples are given in FIGS. 35 and 36. In FIG. 35 a passageway containing streamwise vortices is denoted by 43. The passageway contains salient edges 44 and 45. A movable element 46 is provided which pivots about 47. When a suitable means causes 46 to move to its upward position as indicated by arrow 48, the effect of the edges 44 and 45 is removed.

In FIG. 36 the passageway 43 contains a movable plate 49 with salient edge 50. This edge acts like a thin airfoil of small aspect ratio. The flow is similar to that described in connection with FIG. 6. The plate 49 is connected by 51 to a mechanism which translates it in the direction of the arrow 52. When the plate is translated to the right, the edge 50 is removed from the flow and the operation of the machine is modified.

FIG. 37 shows an additional modification to the passageway of FIG. 14. Unlike conventional machines there is no requirement on the passageways to be composed of surfaces swept out by axial generatix. This requirement is only encountered at the regions where the flow passes from one cascade of blades to the next. Consequently, the circular portions of the passageway are staggered in an axial direction. The shell side of the impeller is 53; the core side 54; the suction side 55; and the pressure side 56. This configuration is beneficial in suppressing other secondary flows which are not desirable.

Figure 38:
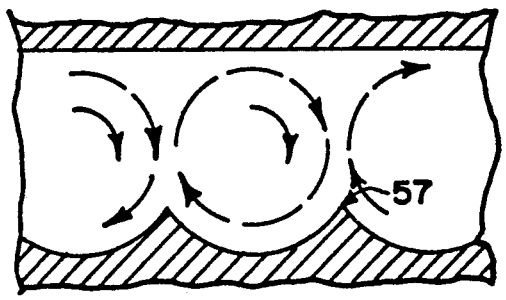
FIG. 38 shows an array of co-rotating vortices.

Various arrays of vortices are found to be stable in nature. This suggests that such configurations can also be used in the present invention as shown in FIGS. 38 through 42. FIG. 38 shows a single row of vortices. These vortices are co-rotating as opposed to the contra-rotating single row discussed previously. This row is generated by the edges 57 which are located on one wall only.

Figure 39:
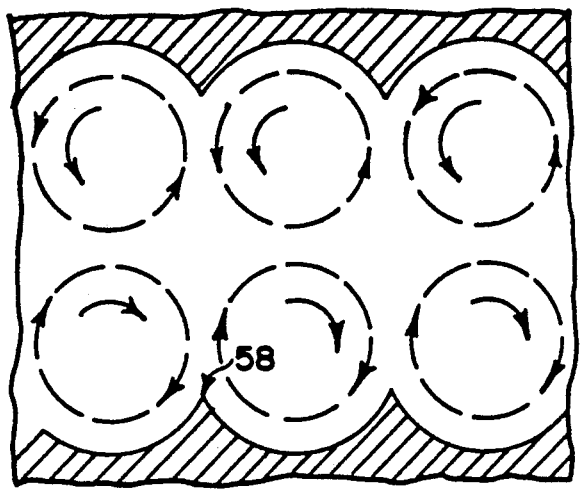
FIGS. 39 through 42 are schematic representations of arrangements of vortices.
Figure 40:
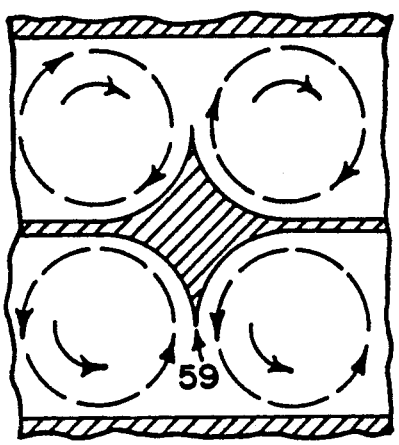
Figure 41:
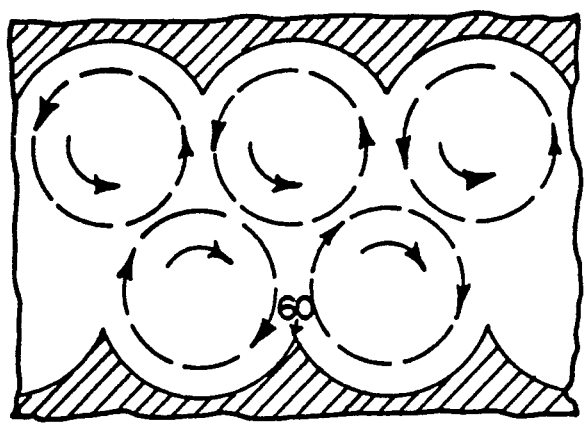
Figure 42:
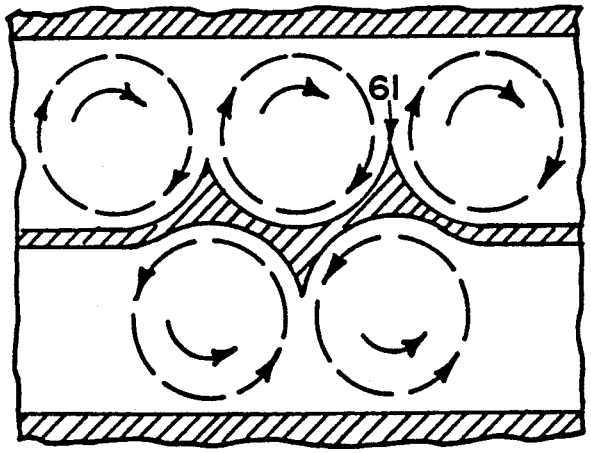

FIGS. 39 and 40 show a double row of non-staggered vortices. The vortices in each row rotate in the opposite sense. In FIG. 39 the salient edges 58 protrude from the wall, while in FIG. 40 the salient edges 59 are carried on a centerbody.

Figure 43:
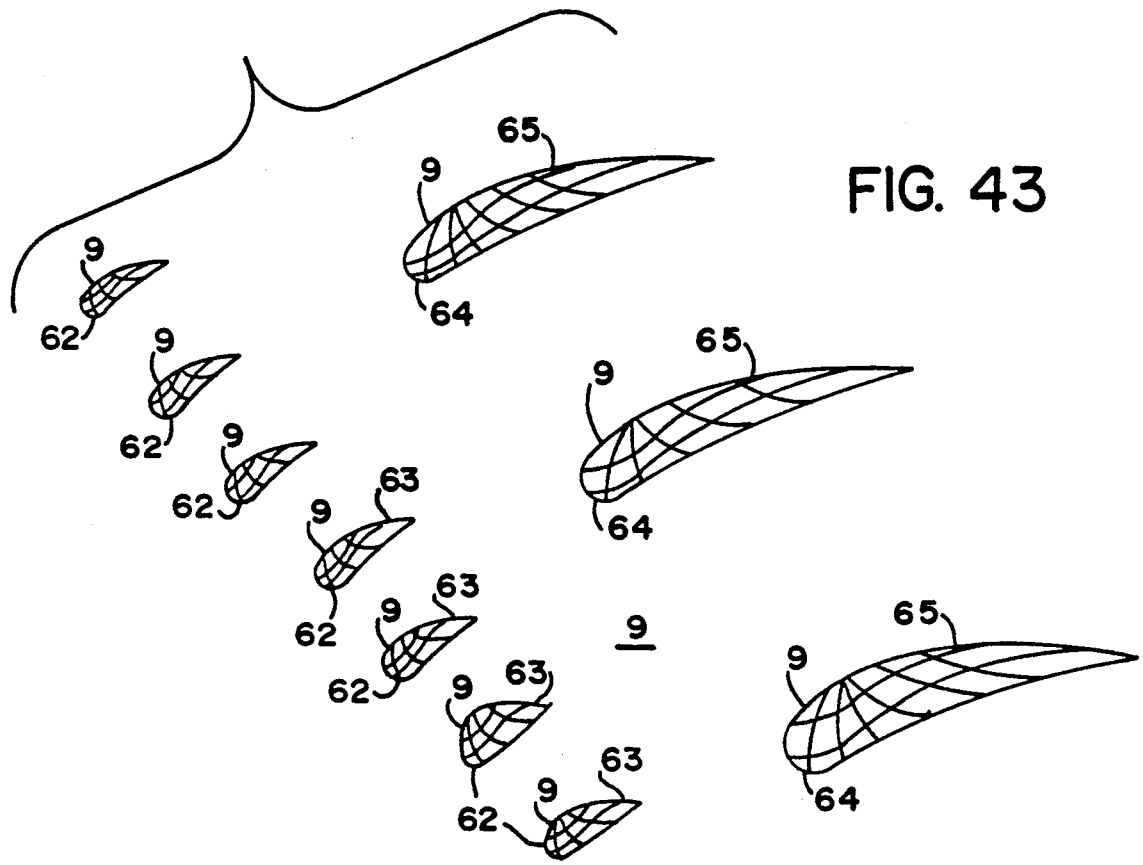
FIG. 43 is a perspective view of a novel arrangement of vorticity generators.

FIG. 43 shows an array of vortex generators 62, 64 which exploit the ability of a following array of elements 64 to roll up the streamwise vorticity generated by a preceeding array 62. This would be especially useful in the overlap region that occurs in the space between edges 23 and 17 in FIG. 1. In FIG. 43 the initial array is composed of a series of protrusions 62 which are located on the shell surface 9. These shapes are curved, cusped airfoils with salient edges 63 generating an array of streamwise vortices. They are followed by a similar row of bodies 64 of larger size and spacing. The vorticity generated by row 62 is rolled up by row 64. The flow on the wall 9 is laminarized in part and its friction loss reduced. The energy wound up in the streamwise vortices is recovered by the turbine structures 19 and 20.

The location of the streamwise vortex within the passageway can be utilized to reduce or prevent unwanted separations and turbulence of the mean flow. For example the vortex core should be located nearer the suction side rather than the pressure side of the passageway. Also the vortex core should be nearer the core side than the shell side.

Figure 44:
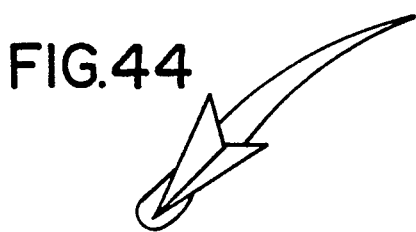
FIGS. 44, 45 and 46 are the top, side and front view of a novel leading edge vorticity generator.
Figure 45:
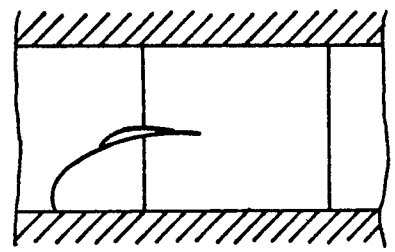
Figure 46:
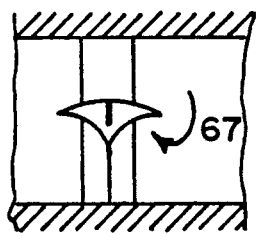

FIGS. 44 through 46 show a modification to a cusp like streamwise vorticity generator which positions the core of the vortex away from the following wall at low angles of attack. The salient edge is denoted by 66 and the arrow 67 shows the vorticity generation.

Figure 47:
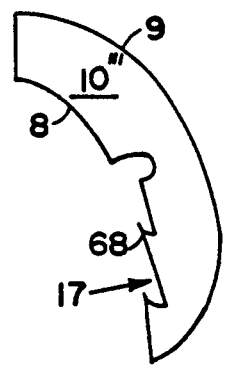
FIG. 47 is a side view of another modification to the blade of FIG. 4.

Previously a description was given of the use of two vortices within a single channel. More than two vortices can be used to advantage, especially in designs which must energize the central region of the passageway to avoid vortex breakdown. Such an arrangement is shown in FIG. 47 which is a modification of the blade 10 of FIG. 4. The salient edge 17 is now cut in a saw tooth fashion as shown by 68. This sawtooth generates a triple helical vortex structure within the passageway.

It is possible to operate the present machine when only partially filled with hydraulic fluid, the remaining space being filled with vapor. The operation of the machine in this mode is quite different than the conventional one. In the novel machine the lowest pressure is located at the vortex cores. Thus, the novel machine can operate when partially filled without the difficulties a conventional machine experiences when a free surface is pierced by a blade.

TECHNICAL DESCRIPTION OF THE INVENTION

I. Introduction

This document discloses a new invention relating to hydrodynamic transmissions. The purpose of the invention is to provide an improvement in the overall range—peak efficiency of the conventional torque converter. This is accomplished by a change in the structure of the flow passages within the device. The novel structure provides the means for energy transfere utilizing streamwise vortices. A streamwise vortex is a rotating flow which has its axis of rotation aligned with the mean stream direction.

Streamwise vortices exist in all conventional turbomachines in various forms and are termed "secondary flows". Such flows ordinarily contribute to energy losses and a good conventional design suppresses them as much as possible. However, the dissipation of the energy of a streamwise vortex is not a rapid process. Indeed, such a vortex is known to be a very stable structure capable of suppressing turbulent energy dissipation. But, a conventional turbomachine is not equipped to recover the energy transported by a streamwise vortex and so this energy is eventually lost.

In contrast to this, the new invention provides a turbomachine with fluid passages and a structure which confines and stabilizes streamwise vortices within these passages. Further, the passages are provided with a structure which forces separation along salient edges deposed along the average direction of flow. These edges generate, enhance, or reverse streamwise vortices so that energy can be transferred into or out of the machine efficiently over a wide range of operating conditions. Thus, the energy loss normally associated with secondary flow does not occur. Instead, the energy of this flow is put to work to increase the efficiency of the machine.

In part II the basic principles of the application of streamwise vortices is explained. Also, the results of experimental work to date is summarized. Part III discusses the nature of the improvement in the basic turbulent flow environment produced by the use of the invention. In Part IV the detailed construction of a machine employing the invention is given. Part V considers the improvement in the range—peak efficiency which can be expected from the application of the invention.

II. Basic Principles of Streamwise Vortex Applications

II-1. Limitations of Conventional Torque Converters

A hydrodynamic transmission consists of a pump and a turbine. The pump is driven by an internal combustion engine which is essentially a constant speed device. The turbine is connected to a load whose speed may vary from zero to a value equal to that of the engine. The purpose of the transmission is to transmit the energy from the engine to the load as efficiently as possible over the entire range of output speed.

A pump and turbine arranged as a hydrodynamic transmission are shown in FIG. 2.1.1. In this scheme a major part of the energy delivered by the engine is converted to kinetic energy of the fluid by the runner of the pump 2.1.1. This kinetic energy is then transformed into potential energy by the diffuser, 2.1.2. The potential energy is then transformed back into kinetic energy by the nozzle 2.1.3 and finally this energy is extracted by the turbine runner 2.1.4. The fluid is then led back to the entrance of the pump to complete the cycle.

The arrangement shown in FIG. 2.1.1. is very inefficient because of the flow energy losses which occur in the diffuser. These losses were eliminated by an invention due to Foettinger who placed the turbine runner in close proximity to the pump runner without an intervening diffuser. Because of this invention made at the turn of the century, hydrodynamic transmissions achieved efficiencies which made them competitive with other forms of transmissions. To this day Foettinger's invention is employed in all commercial hydrodynamic transmission.

The nature of the flow energy losses which occur in a diffuser are illustrated in FIG. 2.1.2a. Before discussing these losses, it is necessary to establish the relative importance of the inertia effects and the viscous effects which operate on the fluid used in a practical machine. This ratio is the Reynold's number and is cf order $10^5$. Thus, inertia effects must predominate everywhere in the fluid except in regions where the fluid shear is very high. In the unstalled diffuser of FIG. 2.1.2, the effects of the viscous forces are confined to a thin boundary layer on the wall of the device. The flow within the boundary layer is turbulent.

Suppose the flow enters the diffuser with a uniform specific kinetic energy $v^2/2$.

As the flow progresses through the device, the kinetic energy in the boundary layer is dissipated by viscous forces. This limits its ability to progress in the direction s against the increasing specific potential energy p/e. If the gradient $\partial p/\partial s$ becomes too large, the flow will separate and the entire flow pattern will change. The diffuser is said to be stalled and the energy losses will greatly increase, see FIG. 2.1.2-b. An efficient design must limit $\partial p/\partial s$ to a value which can be supported by the turbulent transfere of energy into the boundary layer. This is a fundamental limitation on the efficiency of a diffuser. The efficiency is further compromised by unsteadiness and non-uniformities in the kinetic energy of the approaching flow.

Similiar considerations apply to passages within the blade arrays of hydrodynamic transmissions. There is a definite limit to the divergence of the passage which can be tolerated before flow separation occurs. This is illustrated in FIG. 2.1.3 where the passage is denoted 2.3.1.

In the off-design condition the local angle of attack becomes large. This imposes an adverse pressure gradient $\partial p/\partial s > 0$ in the vicinity of the nose of the blade, see FIG. 2.1.4. Here the flow must accelerate to turn the corner 2.4.1 so that the pressure drops to a very low value. After the corner is turned, the kinetic energy must then be converted back into potential energy and the problem of the adverse gradient $\partial p/\partial s$ threatens separation near the nose at position 2.4.1.

Thus, the fundamental design compromise for airfoil shaped blades is as follows, see FIG. 2.1.5-a and 2.1.5-b. The thickness and solidity of the blade must be made large enough to avoid separation at the nose in order to minimize the hydraulic shock loss. But, the passage between the blades must not diverge more then some optimum amount. Both requirements can not be satisfied at the same time. Thus, a compromise results in range—peak efficiency performance which can not be avoided by conventional designs. These limitations arise from the same problem of the adverse pressure gradient in a diffuser which was overcome in part by Foettinger.

In the present invention the conversion of kinetic energy to potential energy in the direction s in the presence of a boundary layer with $\partial p/\partial s>>0$ is also eliminated. This is accomplished by providing the blades with a salient edge deposed along a streamline. As the angle of attack of the blades is increased, the kinetic energy of the tangantial component of the flow is converted into streamwise vorticity, not kinetic energy in he flow direction. As with the Foettinger invention, it is not necessary to convert the kinetic energy of the streamwise vorticity into potential energy with a diverging passage. Instead, the vortex is led directly into the next stage of the machine which is also provided with a salient edge deposed along a streamline. Here, the vorticity is reversed and a transfere of energy is accomplished with very high efficiency. The details of this newly discovered phenomena are explained in the next section.

II-2. Free Diffusion and Vortex Reversal

In the absence of a boundary layer, the conversion of the kinetic energy of the flow to potential energy can take place at very high efficiency. Indeed, this is exactly what happens in the flow which approaches the nose of the blade as shown in FIG. 2.2.1. Ringleb recognized this and labeled this process "free diffusion". He attempted to utilize the phenomena in a cusp shaped diffuser, Ref. 2. The proposed device is shown in FIG. 2.2.2. The secondary layer approaching the salient edge 2.2.1 of the cusp is not subjected to a strong adverse pressure gradient. Hence, flow separation is avoided. The free diffusion process occurs along the stagnation streamline 2.2.1. Ringleb gives a two dimensional design method which provides for a trapped, stable vortex at position 2.2.3. The device does not operate as designed. Fluid leaving the salient edge 2.2.1 has lost energy to viscous forces along the boundary. This does not affect the free diffusion greatly, but upon reaching the stagnation point, a part of the low energy fluid 2.2.4 is returned to the interior of the vortex. Thus, low energy fluid accumulates in the trapped flow region and destroys the stability of the vortex. A large perturbation of the flow occurs and this low energy fluid is expelled downstream. A new vortex is formed from the high energy flow and the total energy loss is large. This process continues in an irregular fashion and the flow over the cusp diffuser suffers large turbulent losses similar to a duct with a sudden expansion or to a stalled diffuser.

Under special circumstances not considered by Ringleb, a trapped vortex can be utilized efficiently. This requires a special geometry which was first investigated by Saunders, Ref 3. And confirmed by Roshko, Ref 4. This very simple idea formed the basis for the roof mounted wind deflector which initiated the truck aerodynamic device industry.

Returning to Ringleb's idea, it can be seen that efficient free diffusion is possible with a cusp-like device provided that the low energy fluid is removed. An easy way to accomplish this is to have a component of the flow normal to the plane of the paper in FIG. 2.2.2. Thus, the low energy fluid is swept downstream, and a stable vortex is generated in the lee of the cusp. However, this is no longer a two dimensional flow and the vortex is a streamwise vortex since its axis is parallel to the normal component of the flow. Such a flow is truly three dimensional since the vortex must have a beginning and an end. But, it is very helpful to conceive of the flow as having a two dimensional section given by a picture such as that of FIG. 2.2.2 cut from a more general flow with a component normal to this section.

The new phenomena of vortex reversal is seen to involve free diffusion. In order to transfere energy into the blade array, pressure forces are required. Thus, a conversion of kinetic energy to potential energy must take place. But, this transfere is now done by free diffusion which breaks the requirement of a diffuser duct with $\partial p/\partial s$ opposing the boundary layer along its wall. Thus, the new phenomena yields very high efficiency of energy transfers. Experimental data illustrating this new phenomena are given in the next two sections.

II-3. Experiments with Two Dimensional Vortex Reversal

As explained in section II-2, it is very helpful to think of a streamwise vortex as a two dimensional flow in a plane normal to the axis of the vortex. Accordingly, experiments were undertaken in a water table to investigate the key phenomena of vortex enhancement and reversal. If the flow is unsteady, accumulation of low energy particles in the cusp vortex can be avoided and the phenomena is easily demonstrated.

The first series of experiments to be described concern vortex reversal in a linear array of co-rotating vortices. The array is generated and reversed in the water table with an arrangement shown schematically in FIG. 2.3.1. The cusps are formed of circular sections and their dimensions are given in FIG. 2.3.2. The cusps are carried by a towing cart and are moved through the water parallel to a line connecting their salient edges. The motion consists of a constant speed translation in one direction followed by a sudden reversal to a similiar motion in the opposite direction. After several repetitions of this motion, a cyclical state is achieved. The resulting flow of the fluid is made visable by the use of hydrogen bubbles emitted from a wire stretched between two cusps.

Figure 48:
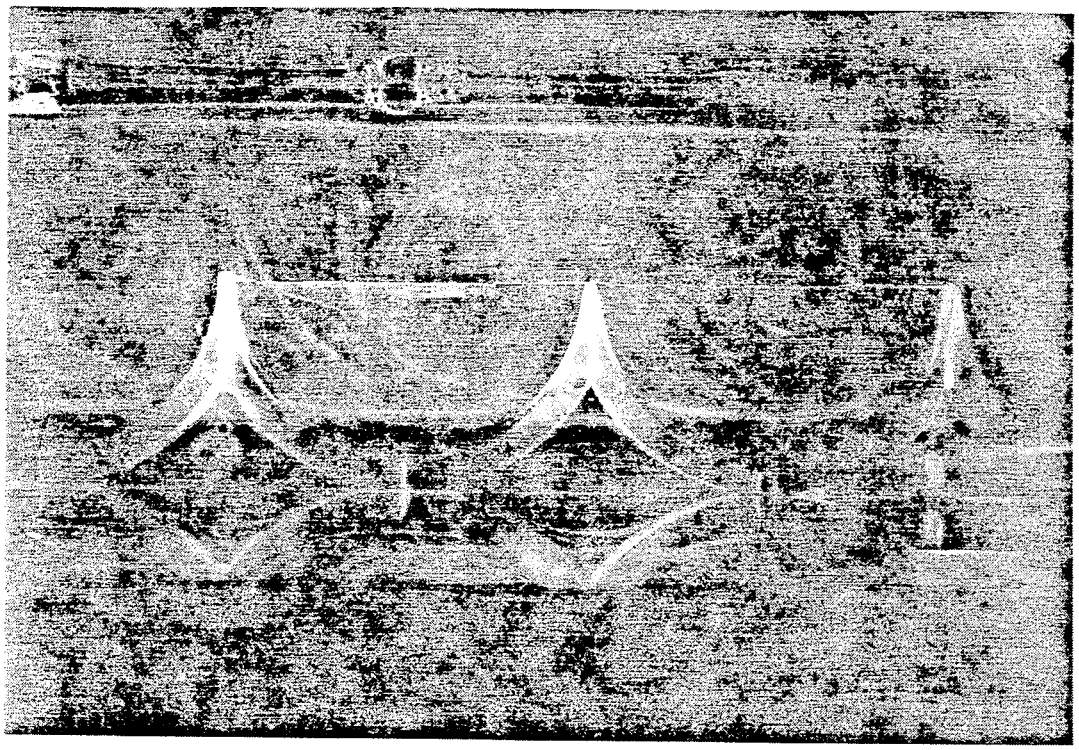

During each cycle of the experiment, each vortex of the array is observed to reverse direction without any indication of instabilities or turbulence. The core of each vortex moves along a line connecting the edges of the cusps suggesting that the vortex is stable along this line. In the photograph of FIG. 48, a counter clockwise vortex is observed when the motion of the cart is to the right. The right hand side of the cusp is at a higher pressure than the left hand side. When the motion is reversed, the counter clockwise vortex is observed to unwind and then to wind up again into a clockwise vortex to the right of the salient edge. Similiarly, the pressure and suction sides of the cusps are reversed. During this motion, the exchange of pressure and kinetic energy as free diffusion occurs away from the developing boundary layer and so is virtually loss free.

To investigate the effects of turbulence on the flows shown in FIG. 48, a grid was used to generate a homogeneous turbulent flow in the tank before the motion was begun. Even large amounts of initial turbulence failed to change the basic vortex reversal phenomena.

Figure 49:
Figure 50:
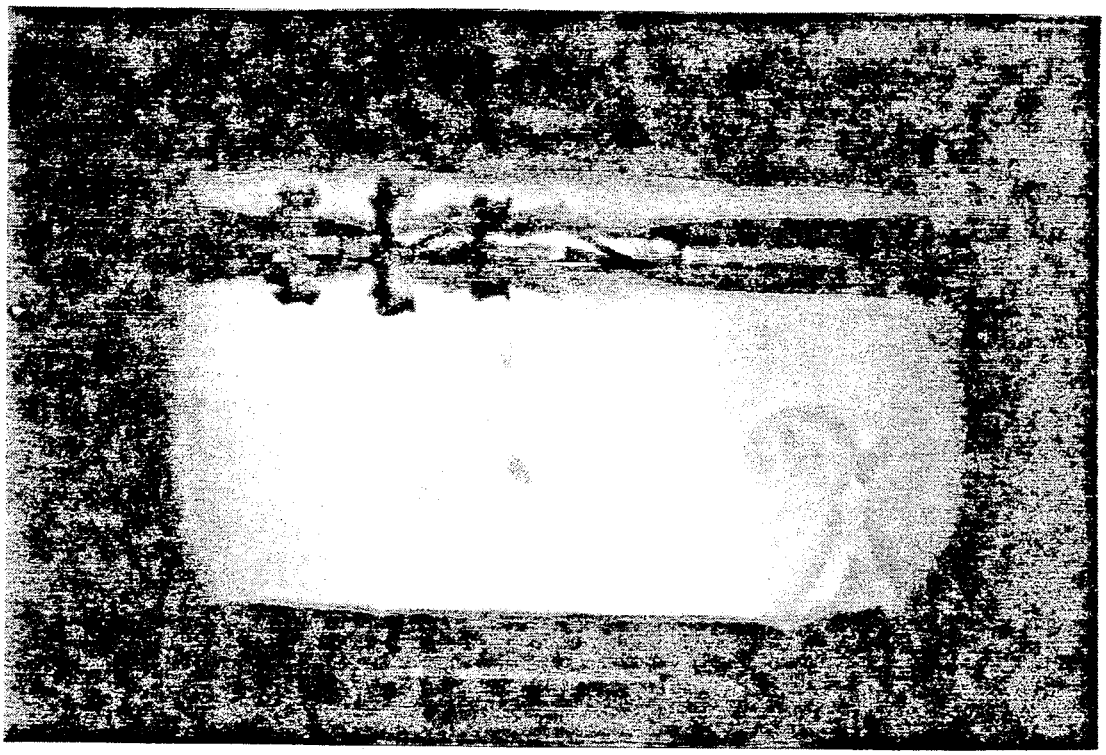

The next series of experiments to be described concern a linear array of contra-rotating vortices, see FIG. 2.3.3. The photograph of FIG. 49 shows the flow which results. In this case the vortices do not change their sense of rotation. However, when the cart is accelerated, the vortices are energized and translated with the cart, while their cores remain centered as shown. When the motion is such that the vortex strength is increased, the array of vortices is said to be enhanced by the motion. In FIG. 49 the vortex sheet leaving the salient edge is seen to be bending to the right hand side for all cusps. When the motion is reversed these sheets bend to the left. A shadow graph of this is shown in the photograph of FIG. 50. The shadow graph technique is described in Ref. 5 and is useful for picking out details of the flow. In this case the spiral roll-up of the vortex sheets is easily seen. If a uniform flow perpendicular to the plane of FIG. 50 is imagined as convecting this spiral sheet downstream, a useful idea about the roll-up of the three-dimensional sheet can be obtained.

Figure 51:
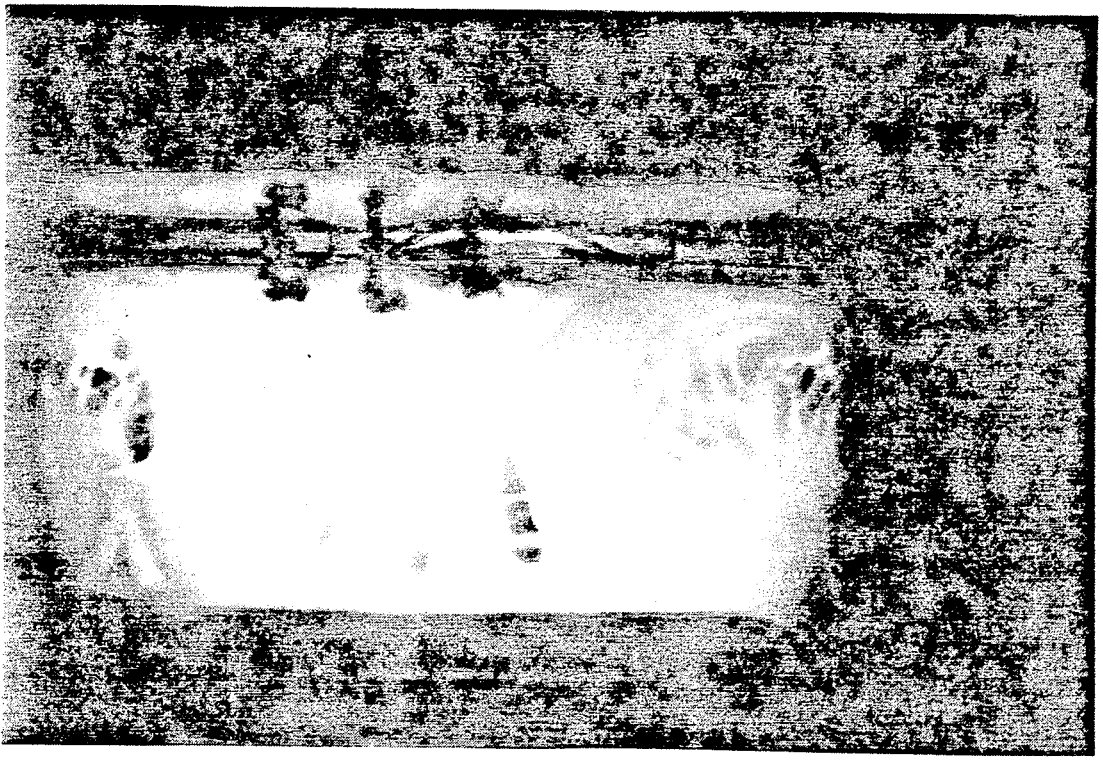

The photograph of FIG. 51 is a shadow graph of the same set up as However, in FIG. 51 the cart is driven so fast that an intense series of surface wavelets are generated at the cusp edges. These wavelets perturb the flow in a manner similiary to turbulent eddies. It can be seen from FIG. 51 that the line of eddies is rolled up into the larger vortex in a way that is similiar to the roll up of the vortex sheet of FIG. 50. This illustrates the tendancy toward stabilization of transverse turbulence by a vortex. It is an illustration only and not a demonstration of the real effect because the turbulence is artificially constrained by the presence of the free surface.

II-4 Streamwise Vortex Flow Visualization

A cascade wind tunnel as shown in FIG. 2.4.1 is used to study the three dimensional generation and reversal of streamwise vortices. The first experiment to be described concerns an array of tubes which generate a stable contra-rotating set of vortices similiary to the two dimensional flow of FIG. 49. The cascade is formed of 3 inch ID thinwall tubes cut as shown in FIG. 2.4.2. The inlet portion of the array has a rounded nose constructed with clay. The flow is visualized using a smoke wire.

Figure 52:
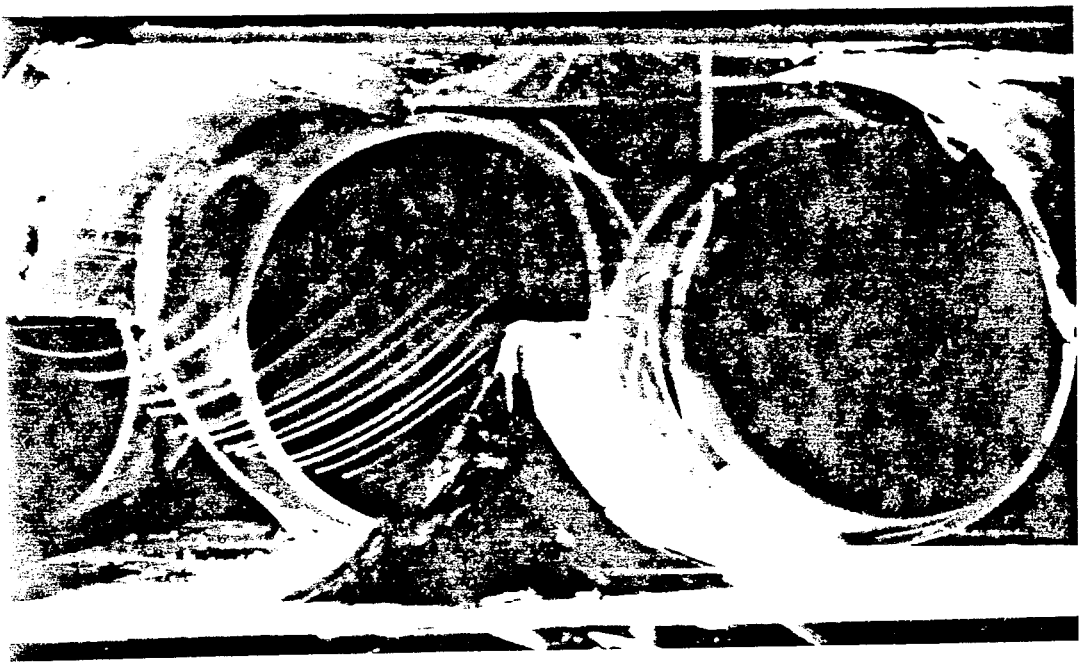
Figure 53:

The photographs of FIGS. 52 and 53 show the generation of a streamwise vortex which is seen to persist downstream inside the tube. The two photos differ only in a slight change of the camera angle. In FIG. 52 the flow along the lee side of the cusp is visable. It is seen that the flow rounds the nose of the cusp and spirals up to the salient edge. No hydraulic shock loss occurs in the flow even though the flow is approaching at a local angle of attack of $\alpha = 40$ degrees.

In FIG. 53 the camera views the cusp from a position in line with the salient edge. This view allows the position of the vortex core to be observed. Comparing the core location in this photo with that of FIG. 49 shows that the three dimensional vortex tends to form further down behind the edge of the cusp. However, the core of the vortex does move toward the stable position at the center of the tube as it progresses downstream. The initial portion of the streamwise vortex is more elliptical then the two dimensional one. But, its shape also approaches the two dimensional circular shape as it moves downstream.

Looking to the left of the center of FIG. 53, the stagnation line terminating on the top wall of the array can be observed. This line separates the counter-clockwise rotating vortex on the left from the clockwise rotating vortex on the right. The stagnation zone terminating this line lies along the end wall of the cascade in a streamwise direction. The free diffusion process is seen to be operating along the stagnation streamline undisturbed by a low energy boundary layer or shear flow. Thus, the process of generation of the vortices is virtually loss free except for the thin vortex sheet which leaves the salient edge of the cusp. The disturbances from this sheet are so small that they are not visable in the photograph.

As discussed in section 3.1 an investigation by Singh, Ref 6 suggests that a streamwise vortex may be unstable when the core of the vortex contains an axial jet in the streamwise direction. Accordingly, an experiment was performed with an axial jet issuing from a nozzle directed into the cascade. The results are given in the photograph of FIG. 56 where the jet nozzle is seen to the left. Smoke wires are located directly in front of the jet and on a strut placed in front of the cascade. The total head of the jet was twice that of the free stream. Smoke in the more turbulent regions of the jet is not visable. However, a time exposure photograph is able to capture enough average streamlines to show that the streamwise vortex still forms in the tube in a stable fashion. Neither the intense turbulent mixing nor the axial velocity of the jet changes the essential features of the flow.

Figure 54:
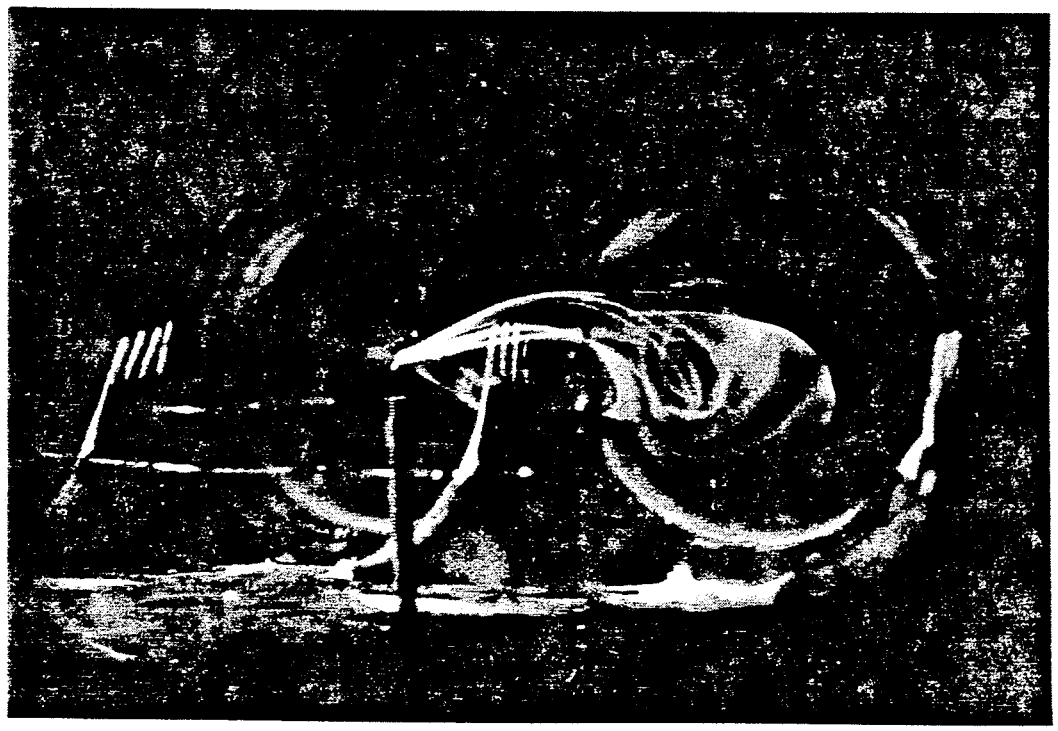
Figure 55:
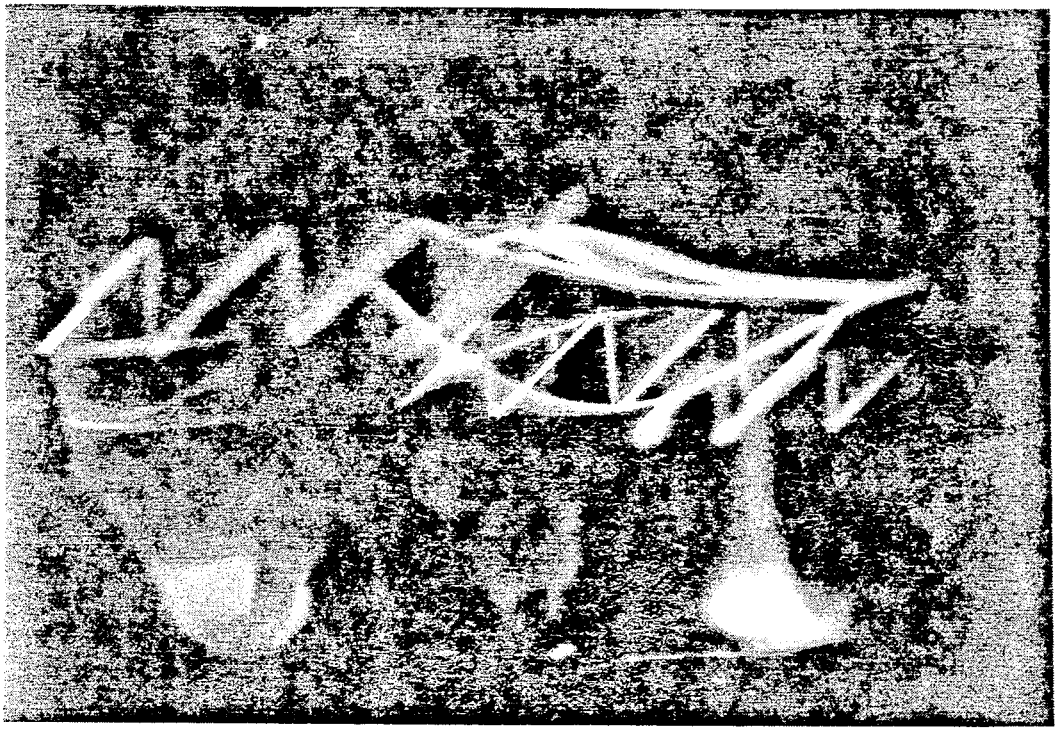
Figure 56:
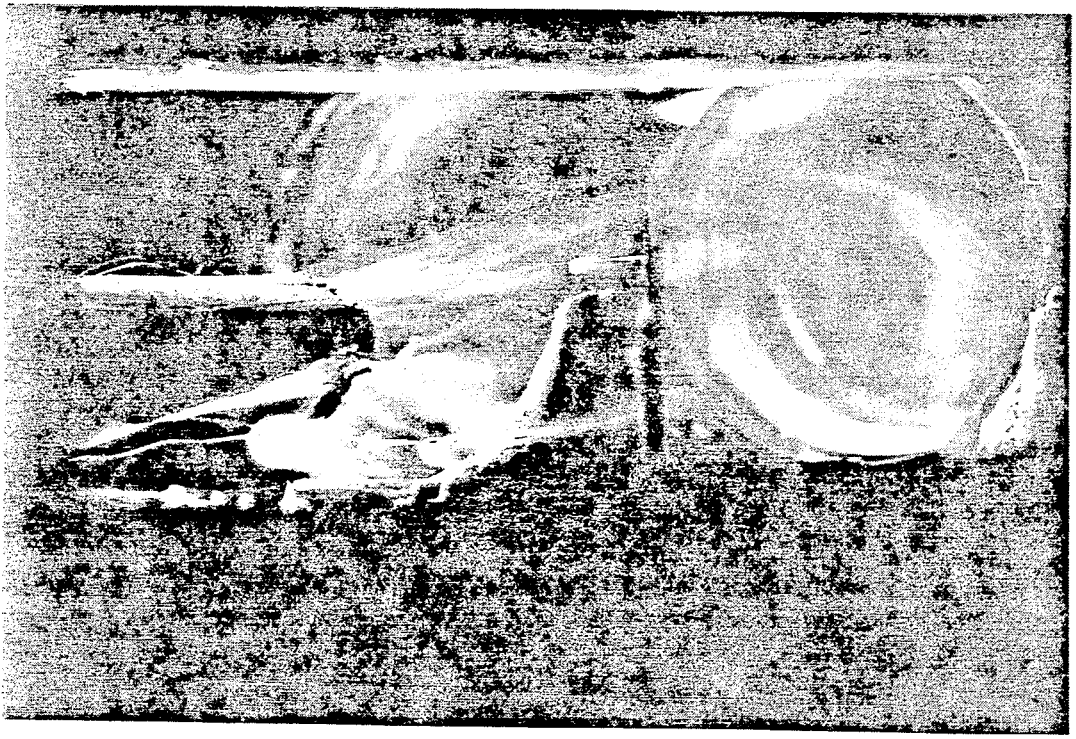

Similiar experiments were made with arrays of tubes to generate all of the variations of streamwise vortices shown in FIG. 2.4.4. In all of these cases stable vortices are easily generated. An interesting variation in the structure of the cusp of a co-rotating array is shown in the photographs of FIGS. 54 and 55. The planform of the salient edge of the cusp has been modified to a sawtooth shape, see FIG. 55. This generates an interlaced spiral of three helical streamwise vortices all of which are stable.

Streamwise vortex reversal has also been observed in the cascade wind tunnel. The set up is shown in FIG. 2.4.5. An initial set of tubes is used to generate the vortex array which is then reversed by a second set of tubes. In addition to the steady state reversal, unsteady reversal has been observed when the first cascade is translated past the second cascade. Since the smoke must be observed inside the curved walls of the model, photographs of the flow are difficult to interpret and are not included. In all cases tested, however, it is possible to observe by eye the generation of stable streamwise vortices in the second cascade of tubes.

In addition to these observations a number of experiments have been carried out which demonstrate streamwise vortex generation from salient edges which are curved with respect to the approaching flow. Also, streamwise vortices have been observed which are generated by a salient edge at the rear of a cascade when the edge is deposed at an angle with respect to the stream and is loaded by a cross flow.

The smoke wire technique is limited to low Reynolds number experiments. However, it is easy to extend the observation of the flow pattern to higher Reynolds number by using the wool tuft technique and the stethoscope probe technique. The Reynolds number is increased to the value existing in the full scale torque converter by increasing the tunnel speed. The flow pattern is observed not to change with speed. Thus, these results are independent of Reynolds number as expected. Since the flow pattern does not alter with Reynolds number for stationary arrays, it is not expected to vary when moving cascades are used.

Additional experiments were performed in an axial flow rig shown schematically in FIG. 2.4.6. These experiments were concerned primarily with the effects of centrifical and Coriolis forces on the generation and reversal of streamwise vortices. In addition this rig does not have an artificial boundary condition at the ends of the array as does the cascade tunnel. Thus, the cascade data can be verified. Experiments on tube deformations, nested tubes, bent tubes, and crescent shaped stators were all carried out with this rig as indicated in FIGS. 2.4.6-a through 2.4.6-c. Vortex breakdown was observed with the model shown with the label "excessive area". All of the experiments performed with this rig support the contention that the present invention will be successful if designed within reasonable limits.

The general impression of all of the observations described in this section is that the generation of streamwise vortices is a very powerful mechanism which will operate over a wide range of approaching flow angles, vorticity distributions, and turbulence levels.

III. Modifications to the Flow Caused by Streamwise Vortices

The nature of the turbulent flow in turbomachinery is not well understood. Nevertheless, it is necessary to consider this complicated phenomena if real progress is to be made. This section discusses the modifications to the flow expected from the introduction of streamwise vortices and the implications for the design of the machine.

III-1. Persistance of Energy of Streamwise Vortex

The streamwise vortices shed by the wings of large aircraft persist for miles. This poses a seriours hazard for a light aircraft attempting to land following the arrival of a larger commercial jet. Consequently, the fluid dynamics of this problem has attracted a great deal of attention in recent years. Various devices have been proposed to break up these vortices and dissipate their energy rapidly. So far this problem has resisted a practical solution. The reason is that a streamwise vortex is remarkably stable and it is just this stability that is exploited by the present invention.

Quantitative measurements on a streamwise vortex are given by Singh, Ref. 6. The vortex is generated by an airfoil spanning one half of a wind tunnel. The arrangement is sketched isometrically in FIG. 3.1.1. The coordinate system used is shown in FIG. 3.1.2. Singh reports the results of hot wire measurements of the flow variables at various downstream stations, z, up to a value of z/c=80 where c is the length of the chord of the wing. The Reynolds number of the experiment is comparable to that found in a torque converter.

In order to establish a basis of comparison of the data of Singh with that of the proposed device, it is necessary to restrict our attention to the flow in the neighborhood of the tip of the airfoil. A control surface for this purpose is sketched in FIG. 3.1.1 and consists of a cylinder whose axis is centered on the trailing vortex core. The flow through the circular sections at z/c=0.8 and z/c=5.0 are given by Singh. For these two stations the length to diameter ratio of the control cylinder is 3.5. In the impeller of FIG. 4.1.4 the streamwise vortex is generated by salient edge 4.1 beginning at station 0 and is conducted by a circular channel to the exit of the impeller at station 10. The length to diameter ratio of this channel is also about 3.5.

If a substantial percentage of the rotational kinetic energy entering the control surface at station z/c=0.8 is dissipated by the time the flow arrives at station z/c=5.0, then there is no hope for the invention. To examine this question it is necessary to perform some calculations on the Singh data and this is explained in the following paragraphs.

Let N be an arbitray extensive property of the fluid with a distribution per unit mass of $\eta$ $$\eta N = \iiint_{C.V.} \eta \rho dV$$

where the integration is taken over the volume enclosed by the control surface. The total time derivative of N is given by $$\frac{DN}{Dt} = \iint_{C.S.} \eta(\rho v \cdot dA) + \frac{\partial}{\partial t} \iiint_{C.V.} \eta \rho dV$$

where the surface integral is taken over the control surface. When N is the mass of the fluid $$\eta = 1 \text{ and } \frac{DN}{Dt} = 0$$

gives the equation of continuity.

The quantity of primary interest is the rotational kinetic energy $$\eta = \frac{v^2}{2}.$$

But first it is necessary to consider the angular momentum of the fluid $\eta = v \times v$. The torque on the control surface, denoted by $M_s$ is given by $$M_s = \iint_{C.S.} (r \times v)(\rho v \cdot dA) + \frac{\partial}{\partial t} \iiint_{C.V.} (r \times v) \rho dV$$

Using the data of FIGS. 2 and 3 of Singh, the total angular momentum entering C.S.(z/c=0.8) and leaving C.S.(z/c=80) are calculated from $$\iint_{C.S.} (r \times v)(\rho v \cdot dA) =$$

$$\frac{1}{\rho} \iint_{C.S.} \left(\frac{r}{c}\right)\left(\frac{U_\theta}{V_o}\right)\left(\frac{U}{V_o}\right)\left(\frac{r}{c}\right) d\left(\frac{r}{c}\right) d\theta =$$

$$\frac{2a}{\rho} \int_0^{r/c=0.6} \left(\frac{r}{c}\right)^2 \left(\frac{U_\theta}{V_o}\right)\left(\frac{U}{V_o}\right) d\left(\frac{r}{c}\right)$$

The normalized results with p=1.0 are plotted in FIG. 3.1.4. Singh gives the values of $U_{74}$ along a line parallel to the span of the wing for both the wing root side and the far wall side of the tunnel. These curves are not symmetrical. Hence the total angular momentum associated with the two curves are different and lead to the different curves of FIG. 3.1.4. However, the total angular momentum associated with either curve does not vary between the two stations within the limits of the resolution of the data.

An interpretation of the above results follows from the observation that no significant shear stresses act on the cylindrical portion of the control surface. Thus, total angular momentum must be conserved. On the other hand, pressure forces on this surface are active and are responsible for the enduring change from one $U_\theta$ profile to the other. These forces result from the fact that the vortex core is not centered in the tunnel. The image of the vortex in the wing root wall has a stronger effect and induces the larger value of $U_\theta$.

The streamwise vortex core is stable within the confines of the duct. When the flow rotates toward the far wall, kinetic energy is stored as potential energy by pressure forces exerted by the wall of the duct. As the flow continues in its helical path this potential energy is transferred back to kinetic energy of rotation. This interchange takes place very efficiently with virtually no energy lost in the process. Similiar efficient processes are encountered in the new invention.

Having established that the angular momentum inside the control surface is conserved, it follows that the vorticity can only change by diffusing outward from the core. This process will continue until the fluid is in solid body rotation where the kinetic energy of rotation will reach a mimimum. The kinetic energy of rotation is a component of the total kinetic energy $$\eta = \frac{v^2}{2}.$$

Thus $$\iint_{C.S.} \eta(\rho v \cdot dA) = \pi \int_1^2 \left(\frac{V_\sigma}{V_o}\right)^2 \left(\frac{V}{V_o}\right)\left(\frac{r}{c}\right) d\left(\frac{r}{c}\right) +$$

$$\pi \int_1^2 \left(\frac{V_\sigma}{V_o}\right)^2 \left(\frac{V}{V_o}\right)\left(\frac{r}{c}\right) d\left(\frac{r}{c}\right) +$$

$$\pi \int_1^2 \left(\frac{V}{V_o}\right)^3 \left(\frac{r}{c}\right) d\left(\frac{r}{c}\right)$$

The second integral on the right hand side measures the rotational kinetic energy. It is computed as a function of r/c, and the results are plotted in FIG. 3.1.5 as a percentage loss in rotational kinetic energy between stations z/c=0.8 and z/c=5.0. The results are referred to the entering rotational kinetic energy.

$$\text{Percent Loss} = \frac{KE_{Rotation}\left(\frac{z}{c} = .8\right) - KE_{Rotation}\left(\frac{z}{c} = 5\right)}{KE_{Rotation}\left(\frac{z}{c} = 0.8\right)}$$

The energy loss occurs principally in the core region, $r/c < \theta 1\ 0.1$. The total loss does not exceed ten per cent. Also plotted in FIG. 3.1.5 is the same result for z/c=80, a value over 20 times further downstream than is of interest for the invention. Even in this extreme case the loss in the rotational kinetic energy does not exceed 40%. It is clear that there is very little inherent dissipation of energy in a streamwise vortex over the distances of interest for the invention.

For an aircraft the energy that trails as a streamwise vortex pair is not recoverable. Thus, it represents a drag loss which must be supplied by the propulsion system. This drag is termed the "induced drag" in the literature. It is calculated by equating the rate at which work must be done in overcoming this component of drag to the rate at which rotational kinetic energy is added to the air. Thus, $$D_{Induced}\ U_o = \iint_{\text{Downstream Plane}}^{\infty} \tfrac{1}{2}\rho U_\sigma^2 V_o dA$$

In the novel machine the "induced drag" of a finite airfoil does not result in an energy loss. Rather, the rotational kinetic energy is efficiently transferred to a following stage of the machine.

The thrust of Singh's paper is to discover instabilities in the streamwise vortex. As pointed out in the discussion, part VII, he is only able to do this with a very special wing of high section L/D>40. According to Singh, instabilities are not found in streamwise vortex systems with large initial turbulence. Yet, this is the operating environment of the invention. Even when Singh manages to produce an instability it does not lead to violent vortex breakdown.

In contrast to this the designer of the novel machine can choose parameters to enhance vortex stability. For example, the planform of the salient edge need not be rectangular. The experiments reported herein use an elliptical leading edge planform. The corresponding modification of the airfoil of Singh is shown in FIG. 3.1.3. A careful study of these and similiar photos show no signs of instabilities developing in the streamwise vortices springing from these elliptical leading edges.

III-2 Flow Stratification and Streamwise Vortices

The previous section examined the suppression of turbulence produced by a streamwise vortex whose axis was a straight line. If such vortices are to be used in a centrifical machine, the effects of curvature must be considered. But first it is necessary to consider the turbulence and curvature effects already present in centrifical machines.

As explained by Johnston, Ref. 7, both wall curvature and wall rotation affect the turbulent boundary layer. FIG. 3.2.1 shows the conditions under which stabilization and destabilization occur. Balje, Ref. 1, pp. 376–389 applies these principles to a description of the flow found in a centrifical rotor. This flow is dominated by the turbulence mechanism and is very complicated. It is the subject of ongoing research and a real understanding of the flow does not exist. Nevertheless, enough data does exist to show what will happen when a streamwise vortex is impressed upon this flow in accordance with the present invention.

In FIGS. 3.2.2-a through 3.2.2-c a flow through a centrifical rotor is shown schematically similiary to that discussed by Balje in connection with his FIG. 6.36. Flow stratification effects result in a low energy core being formed in the corner where the suction side and the shroud side of the passage meet. In the torque converter the hub corresponds to the shell and the shroud to the toroidal core. FIGS. 3.2.3-a through 3.2.3-c shows the effect of imposing a streamwise vortex on this flow. The vortex is generated by a salient edge placed so that the vortex core is closer to the suction side and the shroud side of the passage. The central portion of the streamwise vortex suppresses the turbulence. When the exterior of the streamwise vortex interacts with the wall, the boundary layer turbulence is increased. Thus, the extent of the low energy core is reduced and separation of the flow is suppressed. Low velocity particles accumulate in the vortex core rather than on the walls of the passage. Phenomena similiar to this has been observed in the cascade tunnel. The results are described in section IV-1.

Since the vortex core is further from the hub side and the pressure side, the increase of the turbulence on these walls is not as great as for the opposite side of the passage. Nevertheless, the transport of turbulent energy into these boundary layers is increased and so the blade loading should be increased for optimum results when streamwise vortices are present. One way to increase the blade loading is to use multiple vortices within a single passage. For example, a contra-rotating pair of vortices within a single passage is shown in FIG. 3.2.4. In this design a cusp is used to further stabilize the pair as they are subjected to the Coriolis forces operating in the passage. Notice that the total wetted area of the passage is reduced over a passage constructed of two-dimensional elements. This is further discussed in section IV.

III-3 Skin Friction Reduction by Laminarization

This section describes an additional inventive step which is not necessary to the operation of the machine. This step also results in an overall improvement in the range--peak efficiency of a torque converter by reducing the skin friction losses even in the on-design condition. It exploits the fact that streamwise vortex energy accumulated in a passage of the machine can be recovered in a successive stage.

The idea is illustrated schematically in FIG. 3.3.1. The hub side and the pressure side of the passage are the generators of the greatest portion of the turbulent skin friction losses. Hence, a number of small co-rotating streamwise vortex generators are placed at the entrance to these surfaces. These generators produce a stagnation zone on the wall as discussed in section II-2. The flow leaving the stagnation zone is laminar and its skin friction is correspondingly reduced. As the flow progresses over this surface it encounters another line of vortex generators of larger height. These create additional zones of laminarized flow on the wall of the passage. In addition, they roll up the streamwise vortices shed by the preceeding row of generators. This process is repeated until a single large streamwise vortex is obtained in a stable region of the passage where its energy can be extracted by the next stage of the machine. An appreciable region of laminar flow has been achieved on a surface which would otherwise be subject to very intense turbulence. Since the skin friction produced by laminar flow is much lower than that for turbulence, a substantial net reduction in energy losses is achieved.

It should also be mentioned that the conventional use of small vortex generators to energized the boundary layer and suppress separation can be used with the invention. With a scheme such as in FIG. 3.3.1, the energy consumed by these generators can be partially recovered rather than being lost as in conventional applications. Thus, this application is more efficient in the present case.

III-4 Vortex Breakdown

Vortex breakdown occurs when a streamwise vortex enters a passage which diverges too rapidly. The core of the vortex does not have enough momentum in the s direction to overcome the pressure gradient. In this it is similiary to diffuser stall mentioned in section II-1. However, the breakdown of the flow into turbulence occurs in the interior of the fluid away from a solid boundary. The subject of vortex breakdown is currently the topic of much research and is not well understood, see the review by Hall, Ref. 8.

The phenomena is shown schematically by the sequence of FIGS. 3.4.1–3.4.3. In FIG. 3.4.1 a Venturi tube is shown with conical diffuser. The flow approaches from the left and the pressure is plotted below the section of the tube. For a low diffuser angle, the pressure loss $\Delta p$ is small. In FIG. 3.4.2 a streamwise vortex with swirling velocity is shown approaching the tube. As explained previously, the swirl increases the transfere of energy across the wall boundary layer. Hence, a larger angle of diffuser will give the same low value of $\Delta p$. If the diffuser angle is made larger still, vortex breakdown occurs. This is illustrated in FIG. 3.4.3 by 3.4.1. This results in a sharp increase in the pressure loss $\Delta p$.

The center of the tube is filled with violent turbulent eddies which do not contact a solid surface.

Clearly, vortex breakdown represents a limitation to the efficient application of streamwise vortices. In the experiments conducted to date, vortex breakdown has only been observed in connection with a flow entering a sudden expansion of a duct with an abrupt area increase of two to one. Thus, it does not seem to be operating under the conditions of interest for the invention. However, future work must be prepared to observe this phenomena if it occurs.

Several method of overcoming vortex breakdown are available. First, the divergence of the ducts can be limited as in the conventional machine. Indeed, the design of any airfoil shaped blade is essentially an effort to manage the boundary layer pressure gradient for maximum efficiency. If the pressure distributions are optimum for these boundaries, vortex breakdown will probably be avoided. It has only been observed in the present experiments under extreme conditions.

The second method consists of energizing the vortex core. In this way the maximum value of $\partial p/\partial s$ can be increased. An arrangement such as that shown in FIGS. 54 and 55 will accomplish this. The average core shed by the sawtooth salient edges in these photos contains more energy than that of a single core. Hence, it is more resistant to vortex breakdown.

A third method is of interest in its own right and consists of operating the torque converter partially filled with air. The machine is still charged with sufficient pressure to prevent cavitation, but the air is introduced into the vortex cores. The viscosity and density of the air are very much lower than that of the transmission fluid and so the vortex cores are essentially stable and loss free. The fact that the air will always remain in the center of the passages of the machine through-out the circuit points out the essential differences between the present invention and a conventional machine.

The idea is illustrated for the Venturi tube in FIG. 3.4.4 where an air bubble 3.4.2 is trapped in the core of the swirling flow. The bubble is at an approximately constant pressure and so the graph of the pressure is modified as shown in the figure. Since the core of the streamwise vortex is not greatly affected by the air-oil interface, the kinetic energy of the core can overcome the $\partial p/\partial s$ in FIG. 3.4.4. Notice that the same tube without the air bubble would suffer vortex breakdown, FIG. 3.4.3.

To apply the idea to a practical machine requires that an air charging system be used as well as an oil charging system. The air system could incorporate an air trap at a high point of the system where air escaping from the torus would eventually accumulate. The trap could be provided with a sensor which would indicate when the supply of air was low. The charging pump would then supply air from the atmosphere. If the air supply were adaquate the pump would supply air from the trap to the injection point at a vortex core begining at the stator. If it were desired to vary the capacity of the machine, the vortex cores containing air could be increased or decreased thus providing an efficient means of control.

IV Construction

In this section various constructions of the machine are given. The purpose is to teach the application of the invention. Thus, not all permutations and combinations are covered.

The energy transferred in a torque converter is porportional to the product of the flow rate and the change in periphial velocity. When impacting on an appropriate blade surface, the effect of the streamwise vortex is to augment the change in this periphial velocity. Thus, a good way to investigate the application of the invention is to start with a proven conventional design with a good flow rate and modify it to accept streamwise vortices.

IV-1. Modification to Jandasek's Design

Jandasek, Ref. 9 gives explicit details regarding a contemporary torque converter design intended for automotive use. This design represents a good starting point to explain the modifications required by the present invention. FIG. 4.1.1 corresponds to Jandasek's FIG. A-1 and shows the development of a torus for a 12 inch diameter machine. FIG. 4.1.2 corresponds to Jandasek's A-2 detail of the impeller blade. FIGS. 4.1.3-0 through 4.1.3-10 shows six sections perpendicular to the flow through the impeller developed onto the plane from frustrums of cones through sections 0 through 10 of FIG. 4.1.3-a.

FIGS. 4.1.4-a through 4.1.4-b show a modification to the impeller blade of FIG. 4.1.2 in accordance with the teaching of the invention. The leading edges of alternate impeller blades are cut away to form salient edges 4.1 and 4.2 which are deposed partially along the mean streamwise direction. These edges form contra-rotating streamwise vortices in the regions of station 0 to 4, the sections of FIGS. 4.1.6-0 to 4.1.6-4, which are convected by the mean flow in the sections of FIGS. 4.1.6-6 to 4.1.6-10. A further modification is shown in FIG. 4.1.5 wherein the blade connected to the shell of the torus is further reduced.

The square sections of FIGS. 4.1.3-0 to 4.1.3-10 are now replaced by sections containing cusp-like sections as shown in FIGS. 4.1.6-0 to 4.1.6-10. In this figure, the view of station 0 shows the flow approaching a contra-rotating array of cusps similiary to that shown in FIGS. 52 and 53. Streamwise vortices are generated by these cusps which extend to station 4. Station 2 shows how the cusps are used to guide and stabilize the roll-up of the vortices. Generation of the vortices is complete by station 4 and stations 6 through 10 conduct the fully formed vortices. Since these vortices enhance the stability of the flow, the number of guiding surfaces can be reduced. Thus, the blade in FIG. 4.1.5 has been removed. By station 8 this blade is completely gone. The contra-rotating pair is conducted through station 8 and discharged out of station 10 which is a view shown facing the outflow. The radial edges of the passage are rounded so that a sudden expansion is avoided.

Figure 57:
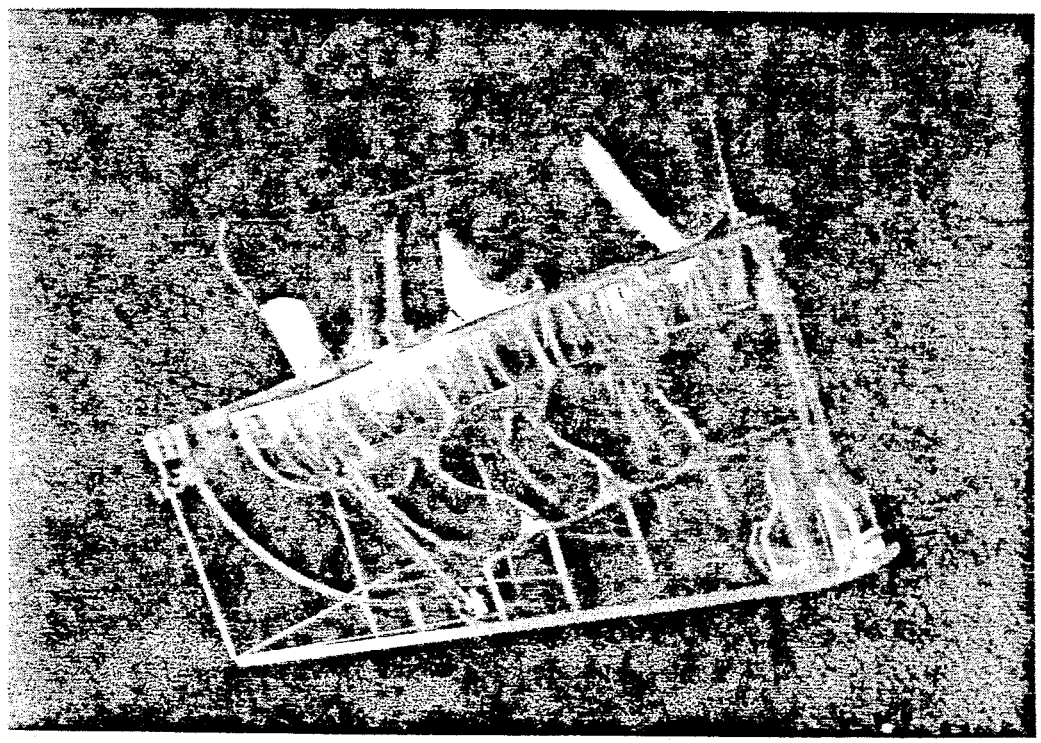

The construction shown in FIGS. 4.1.4 through 4.1.6 is chosen to be a simple modification to Jandasek's impeller. Thus the modified blades are inserted directly into the original core-to-shell space. A plastic model of this modification has been constructed and is shown in FIG. 57. The model has a diameter of 28 inches and comprises a segment of the torus containing four core blades and three shell blades. The salient edges 4.1 and the edges 4.2 visible. A baffle is also shown which extends upwards from the core of the torus. This baffle is added only for experiments in the wind tunnel.

Experiments with the device shown in FIG. 57 were performed in the cascade tunnel. Enough time has not been spent to properly adjust the baffles to achieve true radial cascade flow. Nevertheless, certain qualitative observations are of interest. First, contra-rotating vortices do form as implied by the linear experiments. Second, these vortices persist through the curvature without any indication of breakup or excessive energy dissipation.

An additional series of experiments was run with this device with the cusps blades replaced by thin sheet radial blades very similiary to Jandasek's design. At only moderate angles of attack, the leading edge of these blades stalled. The slow moving particles from the stalled region migrated to the core side of the torus. The flow on the shell side was choked by this accumulation of slow moving particles. The effect is very similiar to that described in connection with FIG. 3.2.3.

IV-2. Modifications to Jandasek's Turbine Runner

FIGS. 4.2.1-a and 4.2.1-b correspond to Jandasek's FIG. A-3 of the turbine runner. The modification required to recover the energy of the streamwise vortices is shown in FIGS. 4.2.2-a and 4.2.2-b Again the entrance portion of the blades has been cut away to provide salient edges 4.3 and 4.4. The flow approaching these edges contains contra-rotating vortices. These vortices are reversed by either 4.3 or 4.4. Thus, pressure forces act on the cusp-like projections to transfere energy to the runner in the correct direction regardless of the sense of rotation of the approaching vortex. An additional modification is also shown in FIG. 4.2.3. Here, most of the shell blade has been removed to increase the loading in a manner similiary to that discussed in conjunction with FIG. 4.1.5.

Additional modifications to Jandasek's design are shown in FIGS. 4.2.1 through 4.2.2-b. Here, the trailing edge of the blades are also cut away as shown by the dotted line in FIG. 4.2.1-a As well, the blade has been extended to overlap the space originally occupied by the stator, see FIG. 4.3.2. (This modification could also be made to the trailing edges of the impeller blades but is not shown for simplicity.) These cut away portions form salient edges 4.5 and 4.6. If these blades are curved in accordance with Jandasek's design criteria they will enhance the energy of the streamwise vortices present in the turbine channels.

FIGS. 4.2.4-0 through 4.2.4-10 show sections through various stations of the turbine containing additional modifications as taught by the invention. Station 10 is a view of the entrance to the turbine as seen by an observer moving inward with the fluid. The cusp-like modifications are similiar to those described in connection with FIG. 4.1.5 of the impeller. The additional features shown in FIGS. 4.2.4-0 through 4.2.4-10 become apparent upon examination of station 4. Here the vortex pair is constrained by a channel which does not fit inside of the core-to-shell space of Jandasek. As the flow proceeds to station 0 the angle between the confined pair of streamwise vortices is rotated so that the flow exits as a stacked array of vortices similiary to that shown in FIG. 2.4.4.

IV-3 Modification to Jandasek's Reactor

FIGS. 4.3.1-a to 4.3.1-b correspond to Jandasek's FIG. A-4, a detail of the reactor blade. Modifications to this reactor are shown in FIGS. 4.3.2-a through 4.3.4-o The streamwise vortices leaving the turbine impinge on salient edges 4.6 and 4.7 where they are reversed. Although these edges are in a radial plane, the approaching vortex array is stacked so that the peak of the vortex generation occurs at opposite times on edges 4.6 and 4.7.

A modification to the trailing edge is shown in FIG. 4.3.4-A, section A—A. The trailing edge is rounded, not sharp. However, this edge is still a salient edge affecting the streamwise vortex. This is because of the close interaction of the trailing edge and the leading edge of the impeller input blade, FIGS. 4.1.4-a and 4.1.4-b, edges 4.1 and 4.2. The flow oscillates over these edges in the manner of the flow leaving a "Thwaites Flap", thereby producing efficient streamwise separation without a sharp edge. A similiar effect can be utilized in connection with the impeller or turbine trailing edges, e.g. edges 4.5 and 4.6 of FIGS. 4.2.2-a and 4.2.2-b

IV4. Variable Geometry

Variable geometry can be provided in the torque converter of the present invention by both conventional and unconventional means. Besides the use of a one-way clutch (which is essentially a variable geometry device), the use of stator blades movable in pitch is widely accepted. FIG. 4.4.1-a shows a blade 4.3 with a pivot 4.1 and bell crank 4.2 similiar to reactor blades used in automotive torque converters. However, the blade has been modified by the addition of salient edges 4.4 which cause the leading edge of the blade to function as a streamwise vortex generator such as 4.6 and 4.7 of FIG. 4.3.2. In this case the cusp like surface is formed like a cresent shaped pyramid as can be seen in the desert where streamwise vortices are generated.

FIGS. 4.4.1-b through 4.4.1-d are top, front and side views, respectively, of blade 4.3 of FIG. 4.4.1-a A more novel approach to variable geometry can be seen in FIGS. 4.4.2 and 4.4.3 where the special characteristics of the invention are exploited. In FIG. 4.4.2, the impeller blade 4.10 has a trailing edge cutout similiary to the turbine blade 4.5 combined with 4.6. A variable element 4.11 is pivoted about 4.12 and suitable means is provided to move this element from the position marked "out" to that marked "in". When the element 4.11 is "in" streamwise vortices are enhanced. Similiar arrangements can be used on the leading edges of arrays.

A similiary idea is shown in FIG. 4.4.3 where the blade 4.10 is now provided with an auxiliary blade 4.14. When this blade is "out" the flow is not affected. When suitable means are used to push the blade "in", streamwise vortices can be enhanced. A stator could be constructed using this idea wherein the blades are completed removed from the circuit. In this case the stator need not be provided with a one-way clutch.

IV-5. Modification to Cusp-Like Vortex Generators

FIGS. 4.5.1-a through 4.5.1-c shows a modification to a cusp-like streamwise vortex generator. In FIGS. 4.5.1-a through 4.5.1-c, the blade is in a cascade utilizing salient edge 4.5.2 to generate a leading edge vortex. Suppose that it is desirable to move the core of this vortex further from the following wall. Then the modification shown in FIGS. 4.5.1-a through 4.5.1-c can be used. The salient edge 4.5.3 is carried on a crosswise member so that the vortex core is further from the centerline of the blade at small angles of attack.

Ref. 12 discusses streamwise vortex generators which are used to energize the boundary layer and prevent separation. No provision is made for recovery of the energy of the vortices. A variety of generators is considered in this reference. Any of these generators could be adapted for the purposes of the invention. In some cases modifications would be required to prevent a stalled region developing in the immediate vicinity of the generator.

Mention should also be made of the fact that a finite wing of low aspect ratio makes a fairly effcient vortex generator for the purposes of the invention. For example the first turbine blades of Walker, Ref. 10 could be cut off at half span. This would result in a vortex generator for co-rotating vortices of fair efficiency. Their efficiency could be improved by shaping the cut edges into appropriate sharpened sections.

IV-6 Co-Rotating Designs

Designs based on co-rotating arrays of streamwise vortices are also possible. Indeed, a machine can mix co- and contra-rotating vortex arrays. In most cases the co-rotating designs derive from conventional designs in a straight forward fashion and so will not be discussed further in this disclosure.

V. Estimates of Improvement in Range--Peak Efficiencies

In this section an estimate will be given of the order of magnitude improvements which are expected from the use of the invention. Of course the actual improvements possible can only be determined from a full scale test of the final design.

V-1. Significance of the Shock Loss

In this section, data in Refs. 9 and 10 are utilized to evaluate the importance of the hydraulic shock loss in a conventional hydrodynamic transmission. The assumption is then made that the energy which is ordinarily lost is instead utilized by the new invention. Thus an estimate of the magnitude of the improvement can be obtained.

Consider first the paper by Walker concerning a multi-turbine converter. The power input to this machine is $$\tau\omega = HdQ$$

where
- $\tau$ = Torque, 16-Ft
- $\omega$ = ANGULAR SPEED, R40/SEC
- H = HEAD, FT
- d = DENSITY OF FLUID, 16/FT$^3$
- Q = CIRCULATION FLOW, FT$^3$/SEC Rearanging gives the head as $$H = \frac{T\omega}{dQ}$$

Now the power input must equal the power output plus the power lost in the fluid circuit. Thus, $$H_{IMPELLER} + \Sigma H_{TURBINE} + \Sigma H_{FLUID\ LOSSES} = 0$$

The hydraulic losses are separated by Walker into two parts:

$$\Sigma H_{FLUID\ LOSSES} = H_{FLOW\ LOSS} + H_{SHOCK\ LOSS}$$

where $H_{FLOW}$ is the flow loss proportional to the wetted surface of the channels in the machine, and $H_{SHOCK}$ is the shock loss which is proportional to the "instantaneous" change in the periphial fluid velocity.

$$H_{Flow\ Loss} = C_f Q^2;\ H_{Shock\ Loss} = \frac{C_S}{2g}(V_1 - V_2)^2$$

Walker measures the power input and the power output of the machine which determines the total hydraulic loss. He then fits the hydraulic loss data empirically so that the flow loss coefficient remains constant and the shock loss is proportional to the difference of the velocity squared. The results of this proceedure are given in Walker's FIG. 19. FIG. 5.1.1 reproduces this data with all of the shock losses added together. The figure shows what happens to the input energy as a function of the speed ratio.

In the invention, the rapid change in periphial velocity is not lost. Instead it is transferred into streamwise vortices which are transported by the main flow. The energy of these vortices is then recovered by the following elements of the machine. Hence, the energy which is lost to hydraulic shock in a conventional machine is utilized efficiently in the novel invention.

To examine the importance of this invention to the overall performance of a torque converter, assume that the shock loss is zero and the flow loss coefficient is unaffected. The entire input energy is then divided between output energy and flow loss. These results may be plotted.

Comparison of FIG. 5.2.1 shows the effect of this change. The useful range of the machine is greatly extended. It is also instructive to compare these results with FIG. 5 of Polak, Ref. 11. Polak is evaluating transmissions for use with the DOE advanced turbine engine. In his FIG. 5, he shows that a conventional three-speed torque converter is competitive with a variable belt drive CVT in the range of vehicle speeds above 20 MHP. The mimimun acceptable efficiency of the transmission is 75%. Comparing the 75% point shows that the lower range of useful speed ratios has been extended from a value of 0.5 to 0.3. This corresponds to the elimination of one gear set from a power shift transmission. The savings in cost, weight, and space resulting from this improvement provide an indication of the economic importance of the invention.

The multi-turbine machine described by Walker was produced in the 1950's for luxury automobiles where smoothness was of major importance. Long before the energy crises of the 1970's, the multi-turbine device was replaced by the three-speed torque converter primarily because of the better efficiency of the latter device. By applying the principles of the invention, however, the multi-turbine device can be made competitive with the advanced machines considered by Polak.

The importance of shock losses for the three element converter can be assessed by examining FIG. 15 of Jandasek, Ref. 9. The data in this figure is obtained by Jandasek from measurements of the efficiency of the machine in the same way as done by Walker. The details are contained in his Appendix B. Again, the data depends on empirically fitting various flow coefficients rather than by direct measurement of the flow variables. Nevertheless the strong effect of shock losses are clear from the magnitude of the change in the inlet angles for the cascades. For example, the stator is subjected to a range of angles of from 28 degrees at a speed ratio of 0.9 to an angle of 150 degrees at a speed ratio of 0.0. The design entrance of the cascade is 90 degrees. Thus, the local angle of attack of this cascade is 60 degrees at the speed ratio of 0. At the 75% efficiency point the local angle is 40 degrees which occurs at a speed ratio of 0.5.

Jandasek fits the data by assuming all of the energy associated with the unmatched periphial component of the velocity is lost. This is the shock loss. But, consider the data given in section II.4 for this same local angle of attack of 40 degrees. FIGS. 54 and 55 are records of actual flows approaching the special construction of the invention. There is no evidence of turbulence loss or reversed mean flow. Instead, the streamlines in the photos clearly show the peripheral component of velocity being wound into a streamwise vortex. This vortex is seen to persist far down into the channel. Thus, the energy which would ordinarily be lost to hydraulic shock is now convected downstream in an orderly fashion from whence it can be recovered. This recovery has been demonstrated experimentally, as described in section II.4.

This data clearly indicates that the useful range of the three element machine can also be extended dramatically while the peak or design point efficiency is maintained.

V-2 Reduction of Flow Losses

This section considers the effect of the use of streamwise vortices on the flow loss coefficient $C_f$. Since the shock losses have been completely eliminated, there must be an elimination of the slow moving particles of turbulent fluid which block the channel. This eliminates the choking effect on the through-flow thus reducing its skin friction.

A further reduction in the choking of the through-flow follows from the fact that the thickness and solidity of the streamwise vortex generating structure required for off-design performance can be reduced over that of conventional blade design. Due to the stability of the vortex structure, the on-design channel loading can be increased as explained in section III. This reduces the required solidity still more. Thus, a further reduction in the value of $C_f$ results.

The presence of the streamwise vortices will tend to suppress turbulence throughout the entire hydraulic circuit. This effect is difficult to assess, but if properly exploited it is bound to have a beneficial result in the lowering of $C_f$.

Suppose that all of the above effects result in a reduction of the value of $C_f$ by 50%. The importance of this can be seen by an inspection of FIG. 5.2.1. Here the data of Walker from FIG. 19 has been replotted with $C_S=0$ and $C_f=\frac{1}{2}C_f$. The 75% efficiency point now occurs at a speed ratio of 0.1. Thus, a torque converter with a single internal gear set is competitive with the best automotive transmissions using multiple external gear sets. In view of the extremely high losses represented by current values of $C_f$, this estimate of a 50% reduction in its value does not seem to be an unreasonable goal.

The above discussion does not take into account the more exotic techniques of air filled vortex cores or laminarization of portions of the boundary layer. The practical application of these ideas would eliminate the need for any gears at all in automotive applications.

REFERENCES (1) O. E. Balje, "Turbo-Machines," John Wiley and Sons, N.Y., N.Y., 1981.
(2) F. O. Ringleb, "Separation Control by Trapped Vortices," "BOUNDARY LAYER AND FLOW CONTROL," Pergamon Press Inc., N.Y., N.Y., 1961.
(3) S. Saunders, U.S. Pat. No. 3,241,876, 1966.
(4) A. Roshko, "Interaction Effects on the Drag of Bluff Bodies in Tandem," "AERODYNAMIC DRAG MECHANISMS," Plenum Press, N.Y., N.Y., 1978.
(5) W. Merzkirch, "Flow Visualization," Academic Press, Inc., N.Y., N.Y., 1974.
(6) P. Singh, "Physics of Fluids," 19:1858 (1976)
(7) J. Johnston, "Internal Flows," "TOPICS IN APPLIED TURBULENCE," Springer-Verlag, N.Y., N.Y. 1976.
(8) M. Hall, "Vortex Breakdown," "ANNUAL REVIEWS OF FLUID MECHANICS," Annual Reviews Inc., Palo Alto, Calif., 1972.
(9) V. Jandasek, "Design of Single Stage Three Element Torque Converter," SAE Publication AE-5, 1973.
(10) F. Walker, "Multiturbine Torque Converters," SAE Publication AE-5, 1973.
(11) J. Polak, "An Automatic Transmission for Automotive Gas Turbine Power Plants," SAE Publication SDP-80/465, 1980.
(12) H. Pearcey, "Shock Induced Separation and Its Prevention," "BOUNDARY LAYER AND FLOW CONTROL," Pergamon Press Inc., N.Y., N.Y., 1961.

It will thus be seen that the objects set forth above among those made apparent from the preceding description are efficiently attached and since certain changes may be made in the invention without departing from the scope thereof, it is intended that all matter contained in the above description shall be interpreted as illustrative and not in a limiting sense.

Having described my invention what I claim as new and desire to secure by Letters Patent is:

1. A torque converter comprising an impeller and a turbine said impeller comprising means adapted to generate streamwise vortices, and said turbine comprising means adapted to reverse the direction of rotation of said vortices to efficiently transfer torque therebetween.

2. A torque converter as defined in claim 1 and a stator formed such that vortices leaving said turbine have their directions of rotation reversed at predetermined speed ratios.

3. A torque converter as defined in claim 2 wherein said stator is formed such that vortices leaving the stator have their directions of rotation reversed at the impeller at predetermined speed ratios.

4. A torque converter as defined in claim 3 wherein said impeller, stator, and turbine are formed such that at below the design speed ratios vortices entering the stator are reversed in their direction of rotation and, above the design speed ratios, are guided by stator passages between said stator blades to the impeller and wherein, below the design speed ratio, the impeller guides the vortices through it to the turbine and, above the design speed ratio, the vortices from the stator are reversed in their direction of rotation by the impeller.

5. A torque converter comprising an impeller formed to create streamwise pairs of vortices and a turbine formed to reverse the direction of rotation of said vortices to extract torque therefrom.

6. A torque converter as defined in claim 5 wherein said impeller comprises blades comprising leading edges disposed along the mean flow stream line to generate said vortices.

7. A torque converter as defined in claim 5 and a stator comprising blades comprising leading edges disposed along the mean flow stream line such that, below the design speed ratio, the direction of rotation of vortices entering the stator is reversed and above the design speed ratio said vortices are guided to the impeller.

8. A torque converter as defined in claim 7 wherein said impeller is formed such that vortices entering the impeller at speed ratios below the design speed ratio are guided through it to the turbine and above the design speed ratio are reversed in their direction of rotation by the impeller.

9. A torque converter comprising an impeller, a turbine, and a stator each comprising blades, the leading edges of the blades of said impeller being shaped such that streamwise vortices are generated in the impeller, and said turbine comprising means for reversing the direction of rotation of said vortices.

10. A torque converter as defined in claim 9 wherein said stator comprises blades, the leading edges of which are shaped such that at certain speed ratios said stator guides entering vortices therethrough, and at other ratios reverses their direction of rotation.

11. A torque converter comprising first and second cascades of blades for acting on fluid flowing into said first cascade and then into said second cascade; said first cascade comprising means for generating vortices in the fluid, said second cascade comprising means for reversing the direction of rotation of said vortices in the fluid and thus recover energy therefrom.

12. A torque converter as defined in claim 11 wherein said blades have leading edges with respect to the fluid flow in the converter and the leading edges of said blades are curved such that they generate and reverse the direction of rotation of said vortices.

13. A torque converter as defined in claim 12 wherein said curve is disposed inwardly of the direction of fluid flow along said blade.

14. A torque converter as defined in claim 11 wherein said blades have leading edges and flow separation occurs under certain conditions at the leading edges of said first cascade causing vortices in the fluid, the leading edges of said second cascade being shaped to reverse the direction of rotation of said vortices to extract energy therefrom under certain conditions.

15. A torque converter as defined in claim 14 wherein said leading edges of said second cascade are curved so as to cause the reversal of the direction of rotation.

16. A torque converter as defined in claim 15 wherein said curve is disposed inwardly of the direction of fluid flow along said blade.

17. A torque converter comprising first and second cascades of blades and a working fluid, the leading edges of at least said second cascade of blades being curved such that the direction of vortices in said fluid is reversed in said second cascade.

18. A torque converter as defined in claim 17 wherein said curved leading edges are curved inwardly with respect to the flow of fluid across said blades.

19. A torque converter as defined in claim 11 wherein said blades of said first cascade have trailing edges shaped to generate said pairs of vortices.

20. A torque converter as defined in claim 11 wherein said blades of said first cascade have side edges shaped to generate said pairs of vortices.

21. A torque converter as defined in claim 11, wherein said torque converter further comprises passages between said cascades shaped to efficiently guide vortices between said first and second cascade of blades.

22. A torque converter as defined in claim 21, wherein said passages are circular in cross section.

23. A torque converter as defined in claim 21, wherein said passages are oval in cross section.

24. A torque converter as defined in claim 21, wherein said passages are cusp-like in cross section.

25. A torque converter as defined in claim 11, wherein said vortices are generated in pairs.

26. A torque converter as defined in claim 25, wherein said vortices are generated in co-rotating pairs.

27. A torque converter as defined in claim 25, wherein said vortices are generated in counter-rotating pairs.

28. A torque converter as defined in claim 11, wherein the blades of one of said cascades have concave edges and the blades of the other cascade of blades have convex edges fitting within the concave edges of the first cascade of blades.

29. A torque converter as defined in claim 11, wherein said fluid comprises both a liquid and a substantial quantity of gas.

30. A torque converter as defined in claim 11, wherein said vortices form interlaced spirals.

31. A torque converter as defined in claim 11, wherein said vortices follow helical paths.

32. A torque converter as defined in claim 11, wherein said means for generating vortices comprises the trailing edges of the blades of said first cascade.

33. A torque converter as defined in claim 21, wherein said passages cause amalgamation of vortices to take place within them.

34. A torque converter as defined in claim 11, wherein the blades of at least one of said cascades take the form of compound curved sheets.

* * * * *